United States Patent
Sarfati et al.

(10) Patent No.: US 7,167,820 B2
(45) Date of Patent: Jan. 23, 2007

(54) APPARATUS FOR AND METHOD OF TESTING APPLICATIONS

(75) Inventors: Jean Claude Sarfati, Epinay sur Seine (FR); Eric Delaunay, Maintenon (FR); Abdellah El Omari, Trappes (FR); Olivier Picard, Nice (FR); Alain Cancel, Chanteloup les vignes (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 520 days.

(21) Appl. No.: 10/257,125

(22) PCT Filed: Apr. 6, 2001

(86) PCT No.: PCT/IB01/00660

§ 371 (c)(1),
(2), (4) Date: Jun. 30, 2003

(87) PCT Pub. No.: WO01/78412

PCT Pub. Date: Oct. 18, 2001

(65) Prior Publication Data

US 2004/0015316 A1    Jan. 22, 2004

(30) Foreign Application Priority Data

Apr. 7, 2000 (EP) ................... 00400971
Aug. 31, 2000 (EP) ................... 00118886

(51) Int. Cl.
*G06F 17/50* (2006.01)
(52) U.S. Cl. ................... 703/13; 455/226.1
(58) Field of Classification Search ................ 703/13; 714/712; 455/67.11, 226.1

See application file for complete search history.

(56) References Cited

U.S. PATENT DOCUMENTS 4,845,446 A * 7/1989 Roth ................... 333/81 R (Continued)

FOREIGN PATENT DOCUMENTS

DE    41 13224 A1    12/1991

(Continued)

OTHER PUBLICATIONS

Paper No. XP 000638522, "Digital Bit Stream Generator For Testing MPEG Video Decoders", by Timothy F. Settle et al., IEEE Transactions on Consumer Electronics, vol. 42, No. 3, Aug. 1996, 11 pages.

*Primary Examiner*—Albert W. Paladini
(74) *Attorney, Agent, or Firm*—Osha Liang LLP

(57) ABSTRACT

A receiver/decoder (for example for digital television) normally receives and/or decodes transmitted data in a normal transmitted signal. In order to test an application running on the receiver/decoder, a special test signal could be generated, or a normal signal could be modified before supply to the receiver/decoder. However, this is costly and complex. To overcome these problems, the receiver/decoder simulates the reception of such transmitted data to produce simulated data; and the application to be tested processes such simulated data in addition to, or instead of, such transmitted data. Simulation may involve generating the simulated data in the receiver/decoder, or controlling the generation of the simulated data by a workstation and receiving the simulated data from the workstation. Data generation may employ a model of the transmitted signal, the model having various parameters which can be varied. Data representative of the simulation may be stored in the receiver/decoder and/or transferred from the workstation to the receiver/decoder, for example in parts on a when-required basis.

38 Claims, 8 Drawing Sheets

U.S. PATENT DOCUMENTS

| | | | |
|---|---|---|---|
| 4,972,511 A | 11/1990 | Singer et al. | 455/226 |
| 5,233,628 A | 8/1993 | Rappaport et al. | 375/10 |
| H1529 H * | 5/1996 | Schneider et al. | 367/54 |
| 5,689,438 A | 11/1997 | Goh | 364/514 R |
| 5,731,839 A | 3/1998 | Panaro | 348/416 |
| 5,798,788 A | 8/1998 | Meehan et al. | 348/180 |
| 5,812,558 A * | 9/1998 | Rotz et al. | 714/712 |
| 6,122,374 A * | 9/2000 | Goujon et al. | 380/227 |
| 6,212,246 B1 * | 4/2001 | Hendrickson | 375/355 |
| 6,735,523 B1 * | 5/2004 | Lin et al. | 701/216 |

FOREIGN PATENT DOCUMENTS

| | | |
|---|---|---|
| WO | WO 98/43165 | 10/1998 |

* cited by examiner

APPARATUS FOR AND METHOD OF TESTING APPLICATIONS

The invention relates to a method of testing, to a method of operating a receiver/decoder, to a receiver/decoder per se, to a modelling method, to a workstation, to a computer program product, and to a bitstream simulator.

The invention has particular application in the context of developing, testing and debugging interactive applications for use in receiver/decoders in digital television systems, although it may also be used, for example, for demonstrating such applications.

Digital television systems transmit television channels to the viewer in digital, rather than analogue, form. The digital channels are encoded into a digital data stream at the transmitter end, and are decoded at the receiver end using a digital decoder, which may be either in a digital set-top box (DSTB) or in an integrated digital television. To allow interactivity, an uplink may be provided, either via the same medium that delivers the television channels, or else via a different medium such as a telephone link. As used herein, the term "digital television system" includes for example any satellite, terrestrial, cable and other system.

As used herein, the term "digital transmission system" includes any transmission system for transmitting or broadcasting for example primarily audiovisual or multimedia digital data. Whilst the present invention is particularly applicable to a broadcast digital television system, the invention may also be applicable to a fixed telecommunications network for multimedia Internet applications, to a closed circuit television, and so on.

The term "receiver/decoder" used herein may connote a receiver for receiving either encoded or non-encoded signals, for example, television and/or radio signals, which may be broadcast or transmitted by some other means. The term may also connote a decoder for decoding received signals. Embodiments of such receiver/decoders may include a decoder integral with the receiver for decoding the received signals, for example, in a "set-top box", such a decoder functioning in combination with a physically separate receiver, or such a decoder including additional functions, such as a web browser, a video recorder, or a television.

Digital decoders typically contain a processor on which programs known as applications may be run. Examples of such applications include programme guides, tele-shopping, quizzes, home-banking, tele-voting and games. Applications may be permanently resident in the DSTB or integrated digital television, or they may be downloaded via the digital medium as and when required. By downloading applications as they are required, the memory requirements of the receiver/decoders can be kept low, since only a limited number of applications need be stored by the receiver/decoder. Furthermore, existing applications can be updated and new applications introduced as required.

Applications may interact with various pieces of hardware in the receiver/decoder, such as tuners, smart card readers, graphics cards, infrared remote control circuits, keyboards, input/output ports or modems, and they may also receive data from the medium in which the television signals are transmitted. In order to provide an interface between applications and the hardware, software modules known as "devices" are provided. Such devices consist of the logical resources necessary for management of external events and physical interfaces. Within the context of the present invention the word "device" is used to indicate such a software module.

Typically, applications are able to process information input to the receiver/decoder by a user, for example via a remote control or a keyboard. For example, an application may display a menu on the television screen from which the user may select a particular option, or the application may be a game in which the user controls the movement of objects on the screen. The data input by the user can be directly interpreted by the application running on the decoder or it can be transmitted via the uplink to allow the appropriate action to be taken.

Data to be used by the application may be transmitted to the decoder in the same data stream as the television channels. Such data may be data transmitted to the decoder as a result of information input by the user. For example, the user may request specific information which is then transmitted to the decoder, or gaming data may be transmitted in response to a move made by the user. Applications which allow the bidirectional transfer of data between a service provider and the receiver/decoder are generally referred to as interactive applications.

Usually, part of the broadcast signal is reserved for the transmission of data to the receiver/decoder for use by applications running on the receiver/decoder. For example, if the broadcast signal uses the MPEG standard, certain MPEG tables or sections may be reserved for the transmission of such data. The receiver/decoder extracts the data that it requires from the broadcast signal. Typically, the application that is running on the receiver/decoder will send a request for the data that it requires to an MLOAD Device in the receiver/decoder, which Device then extracts the required data from the received broadcast signal.

The term MPEG refers to the data transmission standards developed by the International Standards Organisation working group "Motion Pictures Expert Group" and in particular but not exclusively the MPEG-2 standard developed for digital television applications and set out in the documents ISO 13818-1, ISO 13818-2, ISO 13818-3 and ISO 13818-4. In the context of the present patent application, the term includes all variants, modifications or developments of MPEG formats applicable to the field of digital data transmission.

With the rapidly increasing number of services that are being provided to the user, there is a demand for application development tools, which can allow applications to be designed, created, debugged and tested. An example of such an application tool is Mediahighway Application Workshop, supplied by CANAL+.

Known authoring tools typically allow applications to be developed on a workstation, such as a Windows NT or UNIX workstation. When the application is ready for testing, it is downloaded in its entirety to a digital decoder such as a DSTB. The performance of the application with the digital decoder can then be tested.

In most cases, the application will, when deployed for use, be loaded from the digital broadcast signal received by the receiver/decoder. The application typically will also use broadcast MPEG sections or tables, either as application configuration parameters, or as data. Therefore, in order to carry out rigorous testing, the application is preferably executed in an environment in which it can access a signal in a manner as close as possible to that which will be encountered in practice.

International Patent Application Number WO 98/43165 in the name of the present applicant, the subject matter of which is incorporated herein by reference, discloses a system in which an application is tested by running it on a receiver/decoder-type unit under control of a workstation.

Synthetic broadcast data is fed from an external generator to the receiver/decoder-type unit for testing the application. In order to supply the synthetic broadcast data, the external generator either produces an entire artificial broadcast signal, or inserts appropriate control signals into an actual broadcast signal. The generator must either generate, or insert signals into, a high speed, high bandwidth signal, and therefore the generator itself must have high speed and high bandwidth capabilities, which may involve considerable cost and complexity.

According to a first aspect of the present invention, there is provided a method of testing, comprising simulating the reception at a receiver/decoder of data in a broadcast/transmitted signal. Preferably, the simulating is performed in and/or under the control of a receiver/decoder.

According to a second aspect of the present invention, there is provided a method of operating a receiver/decoder for receiving and/or decoding transmitted data in a transmitted signal, the method comprising the steps of: simulating in the receiver/decoder the reception of such transmitted data to produce simulated data; and processing such simulated data in addition to, or instead of, such transmitted data.

By simulating the reception of data in a transmitted signal, for example during a testing or debugging procedure, rather than generating an entire broadcast signal, the hardware requirements for the testing can be reduced.

The methods may be used, for example, for testing one or more components of a broadcast system, such as applications, for instance interactive games and the like, which may be running on a receiver/decoder. The broadcast or transmitted signal may (in a digital context) be any arbitrary part of any larger signal; for example it may be one or more packets, one or more tables, one or more sections, or indeed a complete stream or sequence of the aforementioned packets, tables or sections. The signal may be at least part of a bitstream, for example representing audio and/or visual data. The simulation or model of the broadcast or transmitted signal may be used for the purposes of debugging.

The present invention may also have application in situations other than testing, for example situations such as operating a receiver/decoder or running an application (for example on a receiver/decoder) where data would normally be required from a broadcast signal but this data is not present in a broadcast signal, or the broadcast signal itself is not present.

Preferably, the simulating step includes the step of generating in the receiver/decoder such simulated data. The simulating may indeed be performed exclusively in the receiver/decoder, as opposed to being performed elsewhere in the broadcast system. Alternatively or additionally, the method may further include the step of generating such simulated data outside the receiver/decoder; and the simulating step may include the steps: of controlling the generation of such simulated data; and receiving such generated simulated data.

Preferably, data representative of the simulation is stored in a receiver/decoder. This feature is particularly advantageous where the data is stored in a memory area of the receiver/decoder which may otherwise be spare.

For ease of initialisation, the method may further comprise the step of transferring data representative of the simulation from a workstation to the receiver/decoder. In this case, preferably only part of the data representative of the simulation is transferred to the receiver/decoder at any one time. In this way, more data can be simulated than the memory can hold. For example, short cycle time information could be stored in the receiver/decoder, whilst long cycle time information could be stored in the mass storage of the workstation.

Preferably, the generating step utilises a model of the broadcast signal. The model may include at least one parameter, such as:

a representation of data timing of data in such a transmitted signal; and/or a representation of cycle period of cyclically transmitted data in such a transmitted signal; and/or a representation of a noise property of such a transmitted signal (for example, so that a certain bit error rate can be modelled); and/or which relates to modification of data in such a transmitted signal (so that, for example, data can be added or suppressed; for instance, MPEG sections may be suppressed, and possibly reinstated).

Preferably, at least one such parameter can be varied. It is envisaged that the model may be produced during an initialisation stage, and that the simulation may be performed during an execution stage. If so, the parameter is preferably varied during the execution stage rather than during the initialisation stage. For ease of control, the method preferably further comprises varying at least one such parameter a plurality of times. In this way a sequencer can be provided, which utilises the, steps of creating a list of scheduled events, and executing the events at the appropriate time during the simulation, each event comprising a change to at least one such parameter.

Preferably, the method further includes the step of varying at least one such parameter at a predetermined time after commencement of the simulating step. In this way, appropriate debugging conditions can be reproduced.

Preferably, at least one of the parameters can be changed by an external source, such as a workstation.

Preferably, the method includes the steps of: performing in the receiver/decoder a process (such as an application) which issues a request for data; and supplying such simulated data, rather than such transmitted data, to the process in response to such a request. Hence, a continuous simulated bitstream need not be generated; rather, the necessary data may be supplied in response to specific requests. Preferably, the method further comprises the step of delaying the supplying of the simulated data to the process for a particular delay period after the time ($T_{MLOAD}$) of the issue of the request. For realism of simulation, in the case where at least one such parameter is a representation of the cycle period ($t_{CYC}$), the delay period $t_{LOAD}$ is preferably determined in accordance with $t_{LOAD} = t_{CYC} - ((T_{MLOAD} - T_0) \bmod t_{CYC})$, where $T_0$ is the time at which the cycling commenced.

Preferably, the method further includes the steps of: receiving such transmitted data in such a transmitted signal; and determining whether to process such transmitted data or such simulated data in the processing step.

Preferably, the simulation is performed at a software level between a device driver level and an application level in the receiver/decoder. Preferably, the simulation includes intercepting requests from the application level to the device driver level for data from the broadcast signal.

Preferably, in the simulating step, the reception of such transmitted data from a plurality of transponders is simulated. Indeed, real and simulated (or "virtual") transponders can be mixed.

Preferably, the method may further include the step of freezing the simulation at a given instant, so that debugging can take place.

According to a third aspect of the invention, there is provided a receiver/decoder having means (such as a processor and associated memory) for performing a method according to the first or second aspect of the invention. There may therefore be provided a receiver/decoder comprising means (such as a processor and associated memory) for simulating the reception at the receiver/decoder of data in a broadcast signal. There may therefore also be provided a receiver/decoder for receiving and/or decoding transmitted data in a transmitted signal, the receiver/decoder including means (such as a processor and associated memory) for simulating in the receiver/decoder the reception of such transmitted data to produce simulated data; and means (such as the, or a further, processor and associated memory) for processing such simulated data in addition to, or instead of, such transmitted data.

The means for simulating preferably includes means (such as the, or a further, processor and associated memory) for generating in the receiver/decoder such simulated data. The receiver/decoder preferably further comprises means (such as a further processor, external to the receiver/decoder, and associated memory) for generating such simulated data outside the receiver/decoder, and the means for simulating preferably includes means (such as the, or a further, processor) for controlling the generation of such simulated data and means for receiving such generated simulated data.

The receiver/decoder may further comprise means (such as memory) for storing data representative of the simulation in the receiver/decoder, and may further comprise means (such as the, or a further, processor) for transferring data representative of the simulation from a workstation to the receiver/decoder. The means for transferring data is preferably adapted to transfer only part of the data at any one time.

The means for generating is preferably adapted to utilise a model of such a transmitted signal. The model preferably includes at least one parameter, in which case at least one such parameter may be a representation of data timing of data in such a transmitted signal. At least one such parameter may also or instead be a representation of a cycle period ($t_{CYC}$) of cyclically transmitted data in such a transmitted signal. Also, at least one such parameter may be a representation of a noise property of such a transmitted signal, or may relate to modification of data in such a transmitted signal.

The receiver/decoder preferably further comprises means (such as a processor) for varying at least one such parameter, such means for varying at least one such parameter preferably being adapted to vary such at least one such parameter a plurality of times.

The means for varying at least one such parameter may be adapted to vary such at least one such parameter at a predetermined time after commencement of the simulation.

The receiver/decoder preferably further comprises means (such as a remote device connectable to the receiver/decoder) external to the receiver/decoder for changing at least one of the parameters. The receiver/decoder may further comprise means (such as a processor and associated memory) for performing in the receiver/decoder a process which issues a request for data; and means (such as the, or a further, processor) for supplying such simulated data, rather than such transmitted data, to the process in response to such a request.

The receiver/decoder may further comprise means (such as a processor) for delaying the supplying of the simulated data to the process for a particular delay period after the time ($T_{MLOAD}$) of the issue of the request. The delay period $t_{LOAD}$ is preferably determined in accordance with $t_{LOAD}=t_{CYC}-((T_{MLOAD}-T_0) \bmod t_{CYC})$, where $T_0$ is the time at which the cycling commenced.

The means for simulating is preferably adapted to be performed at a software level between a device driver level and an application level in the receiver/decoder.

The receiver/decoder preferably further comprises means (such as an input) for receiving such transmitted data in such a transmitted signal; and means (such as a processor) for determining whether to process such transmitted data or such simulated data in the processing step.

The means for simulating may be adapted to simulate the reception of such transmitted data from a plurality of transponders. The receiver/decoder may further comprise means (such as a processor) for freezing the simulation.

There is also provided a receiver/decoder comprising a processor and associated memory adapted to simulate the reception at the receiver/decoder of data in a broadcast signal. There is also preferably provided a receiver/decoder for receiving and/or decoding transmitted data in a transmitted signal, the receiver/decoder including a processor and associated memory adapted to simulate in the receiver/decoder the reception of such transmitted data to produce simulated data; and to process such simulated data in addition to, or instead of, such transmitted data.

The receiver/decoder is preferably further adapted to generate in the receiver/decoder such simulated data, but may be further adapted to generate such simulated data outside the receiver/decoder, to control the generation of such simulated data, and to receive such generated simulated data.

The receiver/decoder is preferably further adapted to store data representative of the simulation in the receiver/decoder, and may be further adapted to transfer data representative of the simulation from a workstation to the receiver/decoder, in which case it is preferably further adapted to transfer only part of the data at any one time.

The receiver/decoder is preferably further adapted to utilise a model of such a transmitted signal. The model preferably includes at least one parameter. At least one such parameter may be a representation of data timing of data in such a transmitted signal; it may be a representation of a cycle period $t_{CYC}$) of cyclically transmitted data in such a transmitted signal; it may be a representation of a noise property of such a transmitted signal, or it may relate to modification of data in such a transmitted signal. The receiver/decoder may be further adapted to vary at least one such parameter, and is preferably adapted to vary such at least one such parameter a plurality of times, or it may be further adapted to vary such at least one such parameter at a predetermined time after commencement of the simulation.

The receiver/decoder may be provided in combination with a device external to the receiver/decoder, the device being adapted to change at least one of the parameters.

The receiver/decoder may be further adapted to perform in the receiver/decoder a process which issues a request for data; and to supply such simulated data, rather than such transmitted data, to the process in response to such a request. The receiver/decoder may further be adapted to delay, the supplying of the simulated data to the process for a particular delay period after the time ($T_{MLOAD}$) of the issue of the request. The delay period $t_{LOAD}$ is preferably determined in accordance with $t_{LOAD}=t_{CYC}-((T_{MLOAD}-T_0) \bmod t_{CYC})$, where $T_0$ is the time at which the cycling commenced.

The receiver/decoder is preferably further adapted to perform the simulating at a software level between a device driver level and an application level in the receiver/decoder. The receiver/decoder may be further adapted to receive such transmitted data in such a transmitted signal; and to determine whether to process such transmitted data or such simulated data in the processing step.

The receiver/decoder is preferably further adapted to simulate the reception of such transmitted data from a plurality of transponders, and the receiver/decoder may be further adapted to freeze the simulation.

In a fourth aspect of the invention, there is provided a computer program product adapted to simulate the reception at a receiver/decoder of data in a broadcast/transmitted signal. The computer program product is preferably further adapted to be executed by a processor in a receiver/decoder. There is also provided a computer program product for operating a receiver/decoder for receiving and/or decoding transmitted data in a transmitted signal, the program product being adapted to simulate in the receiver/decoder the reception of such transmitted data to produce simulated data; and process such simulated data in addition to, or instead of, such transmitted data.

The computer program product is preferably further adapted to generate in the receiver/decoder such simulated data, and may be further adapted to control the generation of such simulated data outside the receiver/decoder; and receive such generated simulated data.

The computer program product may be provided in combination with data representative of the simulation, and is preferably further adapted to transfer data representative of the simulation from a workstation to the receiver/decoder. The computer program product is preferably further adapted to transfer to the receiver/decoder only part of data representative of the simulation at any one time.

The computer program product may be further adapted to utilise a model of such a transmitted signal, the model preferably including at least one parameter. At least one such parameter may be a representation of data timing of data in such a transmitted signal; may be a representation of a cycle period ($t_{CYC}$) of cyclically transmitted data in such a transmitted signal, or may be a representation of a noise property of such a transmitted signal. At least one such parameter may also relate to modification of data in such a transmitted signal.

The computer program product may be further adapted to vary at least one such parameter, and is preferably further adapted to vary at least one such parameter a plurality of times, or alternatively it may be further adapted to vary at least one such parameter at a predetermined time after commencement of the simulation.

The computer program product may be further adapted to receive an external command to change at least one of the parameters. The computer program product may also be further adapted to receive a request for data from a process in the receiver/decoder; and supply such simulated data, rather than such transmitted data, to the process in response to such a request. The computer program product may be further adapted to delay the supplying of the simulated data to the process for a particular delay period after the time ($T_{MLOAD}$) of the issue of the request. The delay period $t_{LOAD}$ is preferably determined in accordance with $t_{LOAD} = t_{CYC} - ((T_{MLOAD} - T_0) \mod t_{CYC})$, where $T_0$ is the time at which the cycling commenced.

The computer program product may be adapted to perform the simulation at a software level between a device driver level and an application level in the receiver/decoder. The computer program product is preferably further adapted to receive such transmitted data in such a transmitted signal; and to determine whether to process such transmitted data or such simulated data in the processing step.

The computer program product is preferably further adapted to simulate the reception of such transmitted data from a plurality of transponders, and the computer program product may be further adapted to freeze the simulation.

According to a fifth aspect of the invention, there is provided a modelling method for use with a receiver/decoder for receiving and/or decoding transmitted data in a transmitted signal, the method comprising the step of generating a model of such a signal. The model may be employed in a subsequent simulation of the broadcast signal.

Preferably, the generating step is performed with a workstation, and the method further includes the step of supplying the generated model from the workstation to such a receiver/decoder.

According to a sixth aspect of the invention, there is provided a workstation having means (such as a processor and associated memory) for performing a method according to the fifth aspect of the invention. There may therefore be provided a workstation for use with a receiver/decoder for receiving and/or decoding transmitted data in a transmitted signal, the workstation having means (such as a processor and associated memory) for generating a model of such a signal. Preferably, the model includes at least one parameter, and the workstation further comprises means (preferably in the form of a user interface with associated processor and memory) for varying at least one such parameter, preferably a plurality of times.

According to other aspects of the invention, there are independently provided:

a computer program product (for example as a computer readable medium) having stored thereon a model of a broadcast signal;

a computer program and a computer program product for carrying out any of the methods described herein;

a computer readable medium having stored thereon a program for carrying out any of the methods described herein;

apparatus substantially as described herein with reference to and as illustrated in the accompanying drawings;

a method of testing, comprising receiving at least one parameter of a model of a broadcast signal at a receiver/decoder;

a receiver/decoder having means (such as a processor and associated memory) for receiving a model of a broadcast signal at the receiver/decoder;

apparatus for testing a broadcast system, comprising: a workstation having means (preferably in the form of a processor and associated memory) for generating a model of a broadcast signal; and a receiver/decoder having means (preferably in the form of a processor and associated memory) for simulating reception at the receiver/decoder of data in a broadcast signal and/or for receiving a model of a broadcast signal at the receiver/decoder;

apparatus for testing a broadcast, system, comprising a workstation according to the sixth aspect of the invention, and a receiver/decoder according to the first, second, or third aspects of the invention.

a bitstream simulator;

a workstation substantially as herein described with reference to and as illustrated in FIGS. 5, 6, 9 to 13 of the drawings;

a receiver/decoder substantially as herein described with reference to and as illustrated in FIGS. 1 to 5 and 8 to 13 of the drawings; and a method substantially as described herein with reference to FIGS. 8 to 13 of the drawings.

Features from one aspect of the invention may be applied as appropriate to any other aspect of the invention, independently or in any appropriate combination. Method features may be applied to apparatus aspects and vice versa.

Features implemented in software may also be implemented in hardware and vice versa.

Furthermore, the term "computer program" as used herein preferably connotes one or more sections of computer code which may operate simultaneously or independently, at any or several levels within a computer architecture, executing on one or more processors.

Preferably, a system embodying the invention will allow a developer to:

create MPEG sections and tables
construct a bitstream
define dynamic bitstream parameters
simulate a bitstream
adjust the simulated data flow/data stream manually or by means of a sequencer The system may enable an application to load MPEG tables and MPEG sections belonging to a stream loaded in a decoder's memory cache. These loadings add to the loadings of MPEG tables and MPEG sections derivable from the bitstream of a received broadcast signal.

A stream loaded in a decoder embodying the invention may be composed of three lists of data determined from the stream definition in a development work station:

A list of virtual transponders (or virtual frequencies)
A list of virtual PIDs for each virtual transponder
A list of MPEG tables and sections for each of the virtual PIDs This can provide the possibility for applications to be tuned to real frequencies or to virtual frequencies, or to scan all frequencies, depending on the SCANNING mode (determined during the construction of the stream). The scanning mode may be:

VIRTUAL SCANNING mode: scanning of virtual frequencies (virtual transponders)
VIRTUAL AND REAL SCANNING mode: scanning of virtual frequencies (virtual transponders) and real frequencies
REAL SCANNING mode: scanning of real frequencies In summary, with the bit-stream simulator in a system embodying the invention, it is most typically possible to:
Tune to a real or virtual transponder
Scan the real and virtual transponders
Load an MPEG section (MLOAD_SECTION service) present under a real PID or a virtual PID
Load a group of MPEG sections (MLOAD_GROUP_SECTION service) present under a real PID or a virtual PID
Continuously load an MPEG section (MLOAD_SECTION_ALL service) present under a real PID or a virtual PID
Load a table of MPEG sections (called MLOAD_TABLE_LOAD service) present under a real PID or a virtual PID Preferably, in the course of the simulation, it is possible to alter the behaviour of the stream present in the memory cache.

The bitstream simulator may be used in conjunction with a debugger during the development of an application.

The tool may permit the simulation of video, audio, subtitle, and so on data streams.

A system embodying the invention is advantageously useable with existing application development and debugging tools. Such tools may include the present applicant's "Mediahighway" development platform on a workstation that already has the applicant's EDIT and DEBUGGER tools installed. These tools are disclosed in European Patent Application Numbers 99401746.5 and 00102043.7 both in the name of the present applicant, the subject matter of which is incorporated herein by reference.

The invention may provide the advantage that conventional receiver/decoder hardware can be used to test the application in an execution environment that closely resembles the environment in which the application will execute while in use. The invention may also provide the advantage that the application developer may see the results of any changes made to the application or to the data sent to it.

Preferred features of the present invention will now be described, purely by way of example, with reference to the accompanying drawings, in which.

Figure 8:
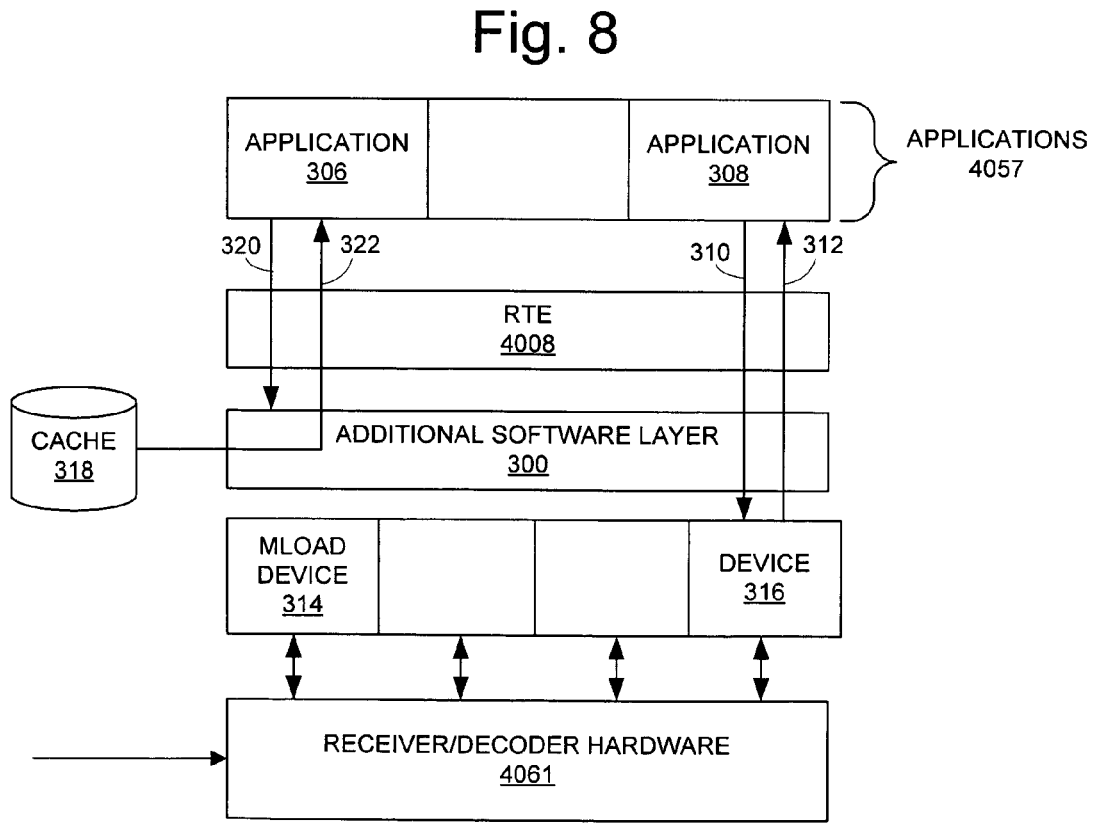
Figure 9:
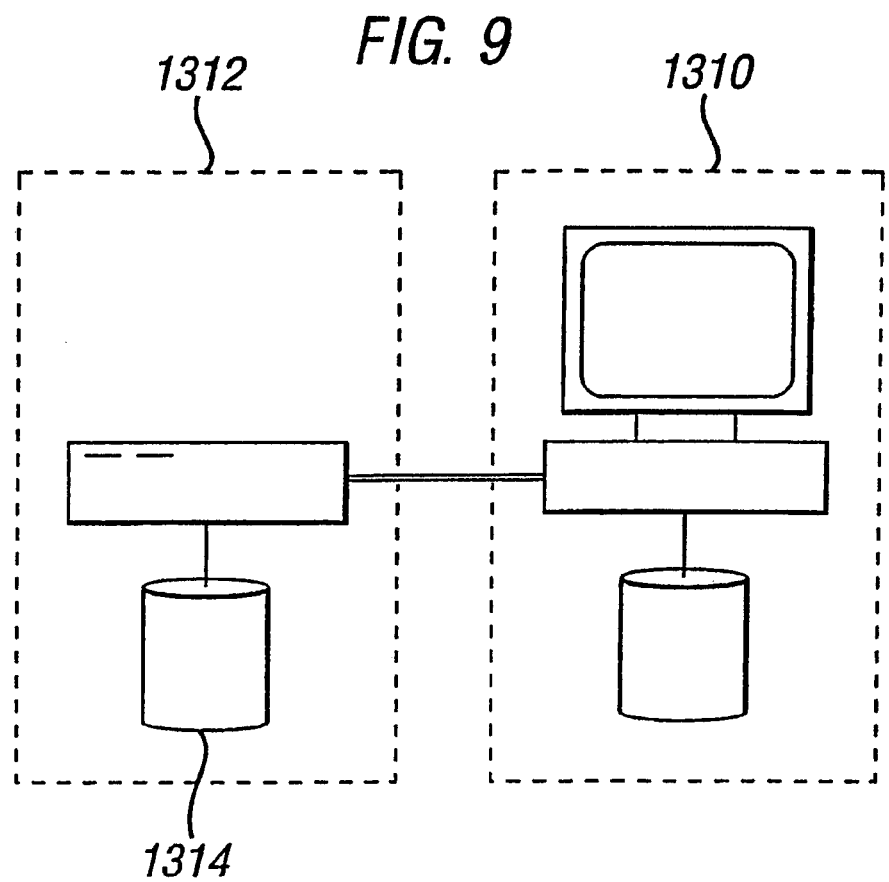
Figure 10:
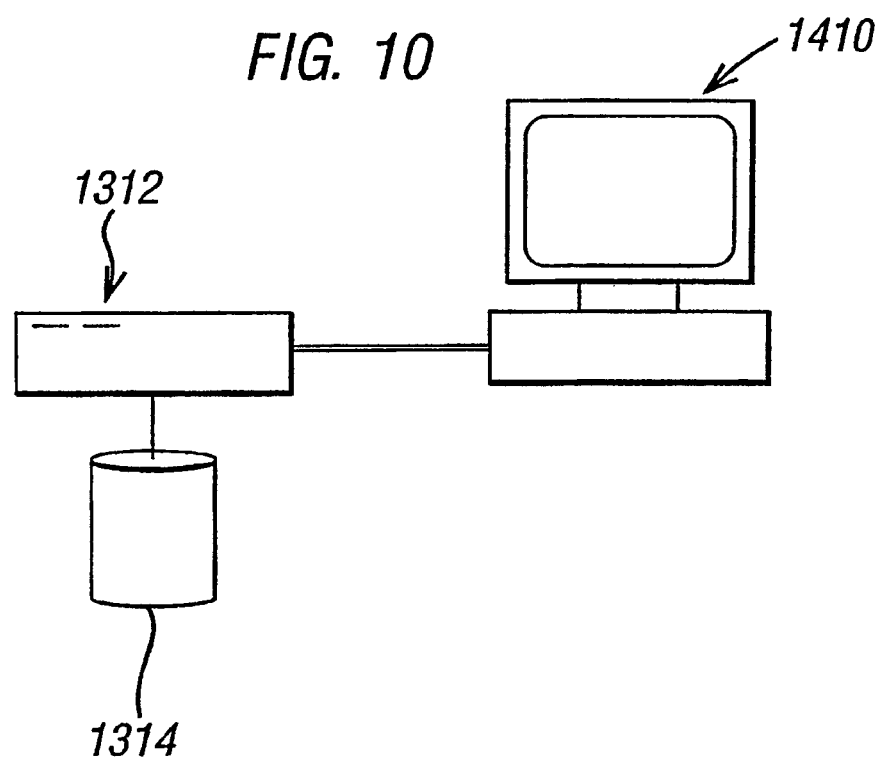
Figure 11:
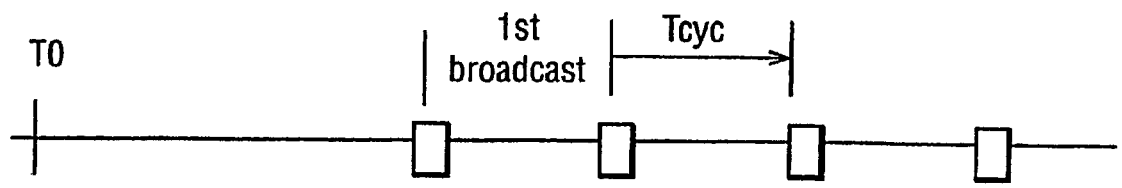

FIG. 8 fiber illustrates the communication between an application and a device;

FIGS. 9 and 10 are diagrammatic representations of testing and debugging systems embodying the present invention;

FIG. 11 is a timing diagram illustrating the time of launch development software;

FIG. 12 show two possible modes of broadcast of MPEG tables; and

Figure 13:
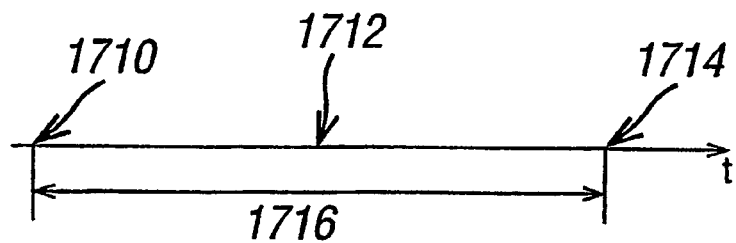

FIG. 13 shows an example of a loading sequence.

OVERVIEW OF A DIGITAL TELEVISION SYSTEM

Figure 1:
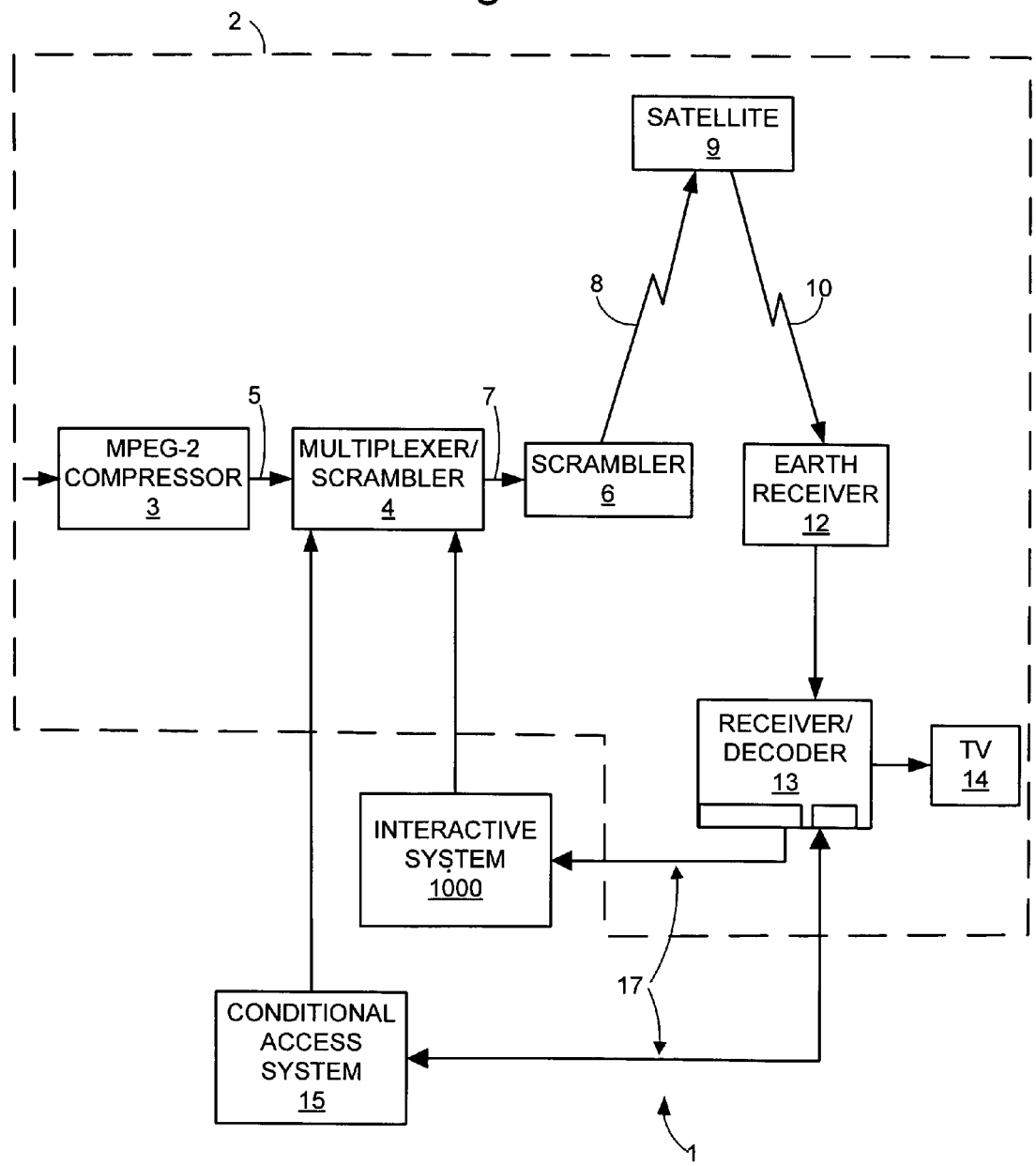
FIG. 1 shows the architecture of a typical digital television system.

An overview of a digital television system 1 is shown in FIG. 1. The embodiment includes a mostly conventional digital television system 2 that uses the known MPEG-2 compression system to transmit compressed digital signals. In more detail, MPEG-2 compressor 3 in a broadcast centre receives a digital signal stream (typically a stream of video signals). The compressor 3 is connected to a multiplexer and scrambler 4 by linkage 5.

The multiplexer 4 receives a plurality of further input signals, assembles the transport stream and transmits compressed digital signals to a transmitter 6 of the broadcast centre via linkage 7, which can of course take a wide variety of forms including telecommunications links. The transmitter 6 transmits electromagnetic signals via uplink 8 towards a satellite transponder 9, where they are electronically processed and broadcast via a downlink 10 to earth receiver 12, conventionally in the form of a dish owned or rented by the end user. Other transport channels for transmission of the data are of course possible, such as terrestrial broadcast, cable transmission, combined satellite/cable links, telephone networks etc.

The signals received by receiver 12 are transmitted to an integrated receiver/decoder 13 owned or rented by the end user and connected to the end user's television set 14. The receiver/decoder 13 decodes the compressed MPEG-2 signal into a television signal for the television set 14. Although a separate receiver/decoder is shown in FIG. 1, the receiver/decoder may also be part of an integrated digital television. As used herein, the term "receiver/decoder" includes a separate receiver/decoder, such as a set-top box, and a television having a receiver/decoder integrated therewith.

In a multichannel system, the multiplexer 4 handles audio and video information received from a number of parallel sources and interacts with the transmitter 6 to broadcast the information along a corresponding number of channels. In addition to audiovisual information, messages or applications or any other sort of digital data may be introduced in some or all of these channels interlaced with the transmitted digital audio and video information.

In an MPEG data stream, each module comprises a group of MPEG tables. Each MPEG table may be formatted as a number of sections. In the MPEG data stream, each section has a "size" of up to 4 kbytes. For data transfer via the serial and parallel port, for example, modules similarly are split into tables and sections, the size of the section varying with the transport medium.

Modules are transported in the MPEG data stream in the form of data packets of typically 188 bytes within respective types of data stream, for example, video data streams, audio data streams and teletext data streams. Each packet is preceded by a Packet Identifier (PID) of 12 bits, one PID for every packet transported in the MPEG data stream. A programme map table (PMT table) contains a list of the different data streams and defines the contents of each data stream according to the respective PID. A PID may alert a Device to the presence of applications in the data stream, the PID being identified using the PMT table.

A conditional access system 15 is connected to the multiplexer 4 and the receiver/decoder 13, and is located partly in the broadcast centre and partly in the decoder. It enables the end user to access digital television broadcasts from one or more broadcast suppliers. A smartcard, capable of deciphering messages relating to commercial offers (that is, one or several television programmes sold by the broadcast supplier), can be inserted into the receiver/decoder 13. Using the decoder 13 and smartcard, the end user may purchase commercial offers in either a subscription mode or a pay-per-view mode.

As mentioned above, programmes transmitted by the system are scrambled at the multiplexer 4, the conditions and encryption keys applied to a given transmission being determined by the access control system 15. Transmission of scrambled data in this way is well known in the field of pay TV systems. Typically, scrambled data is transmitted together with a control word for descrambling of the data, the control word itself being encrypted by a so-called exploitation key and transmitted in encrypted form.

The scrambled data and encrypted control word are then received by the decoder 13 having access to an equivalent to the exploitation key stored on a smart card inserted in the decoder to decrypt the encrypted control word and thereafter descramble the transmitted data. A paid-up subscriber will receive, for example, in a broadcast monthly EMM (Entitlement Management Message) the exploitation key necessary to decrypt the encrypted control word so as to permit viewing of the transmission.

An interactive system 1000, also connected to the multiplexer 4 and the receiver/decoder 13 and again located partly in the broadcast centre and partly in the decoder, enables the end user to interact with various applications via a modemmed back channel 17. The modemmed back channel may also be used for communications used in the conditional access system 15. An interactive system may be used, for example, to enable the viewer to communicate immediately with the transmission centre to demand authorisation to watch a particular event, to download an application etc.

Figure 2:
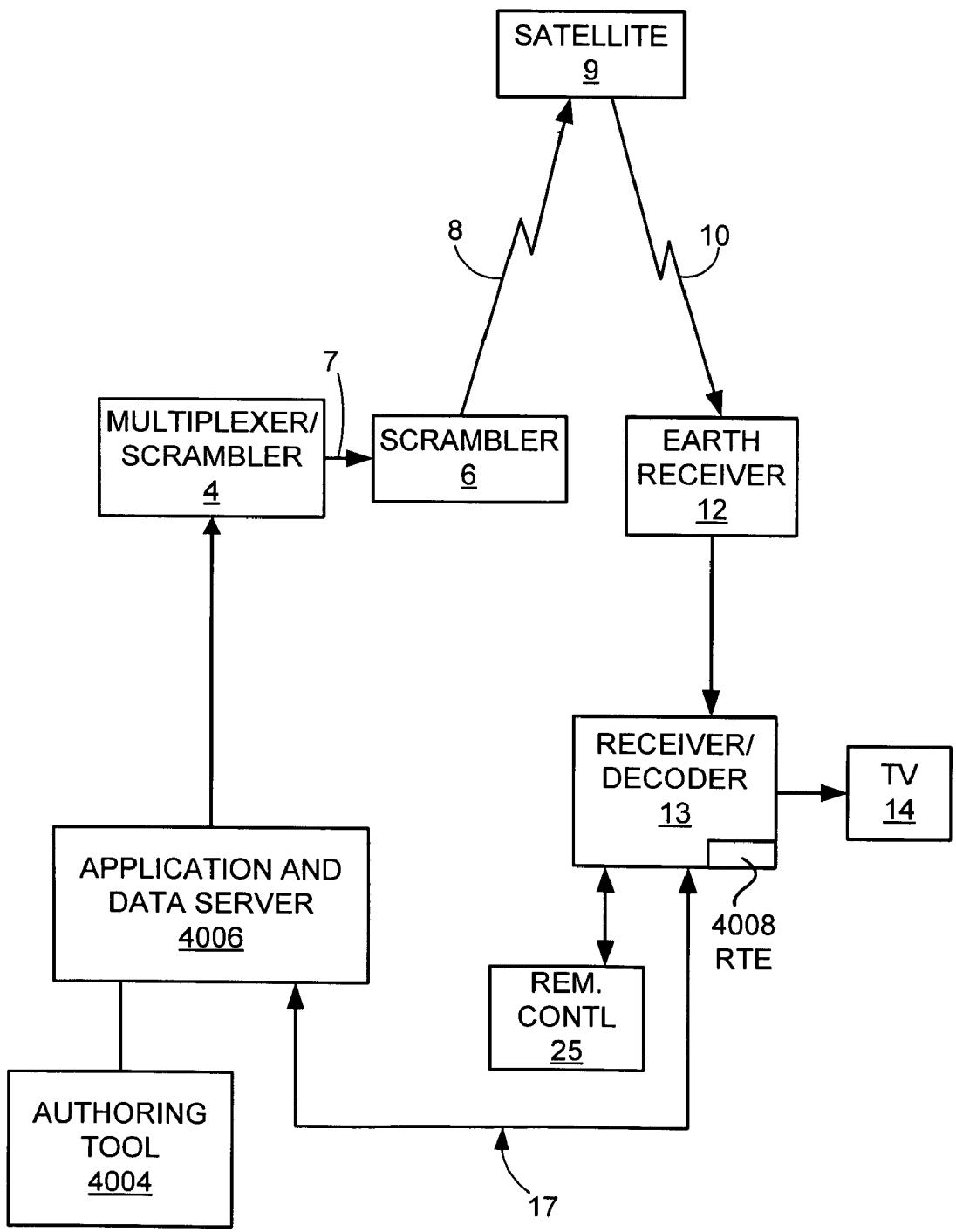
FIG. 2 shows the architecture of an interactive system of the digital television system of FIG. 1.

FIG. 2 shows the general architecture of the interactive television system 1000 of the digital television system 1 of the present invention.

For example, the interactive system 1000 allows an end user to buy items from on-screen catalogues, consult local news and weather maps on demand and play games through their television set.

The interactive system 1000 comprises in overview four main elements:

an authoring tool 4004 at the broadcast centre or elsewhere for enabling a broadcast supplier to create, develop, debug and test applications an application and data server 4006, at the broadcast centre, connected to the authoring tool 4004 for enabling a broadcast supplier to prepare, authenticate and format applications and data for delivery to the multiplexer and scrambler 4 for insertion into the MPEG-2 transport stream (typically the private section thereof) to be broadcast to the end user a virtual machine including a run time engine (RTE) 4008, which is an executable code installed in the receiver/decoder 13 owned or rented by the end user for enabling an end user to receive, authenticate, decompress, and load applications into the working memory of the decoder 13 for execution. The engine 4008 also runs resident, general-purpose applications. The engine 4008 provides the above described services to an end user in a way which is independent of the hardware and operating system a modemmed back channel 17 between the receiver/decoder 13 and the application and data server 4006 to enable signals instructing the server 4006 to insert data and applications into the MPEG-2 transport stream at the request of the end user.

The interactive television system operates using "applications" which control the functions of the receiver/decoder and various Devices contained therein. Applications are represented in the engine 4008 as "resource files". A "module" is a set of resource files and data. A "memory volume" of the receiver/decoder is a storage space for modules. Modules may be downloaded into the receiver/decoder 13 from the MPEG-2 transport stream.

Figure 3:
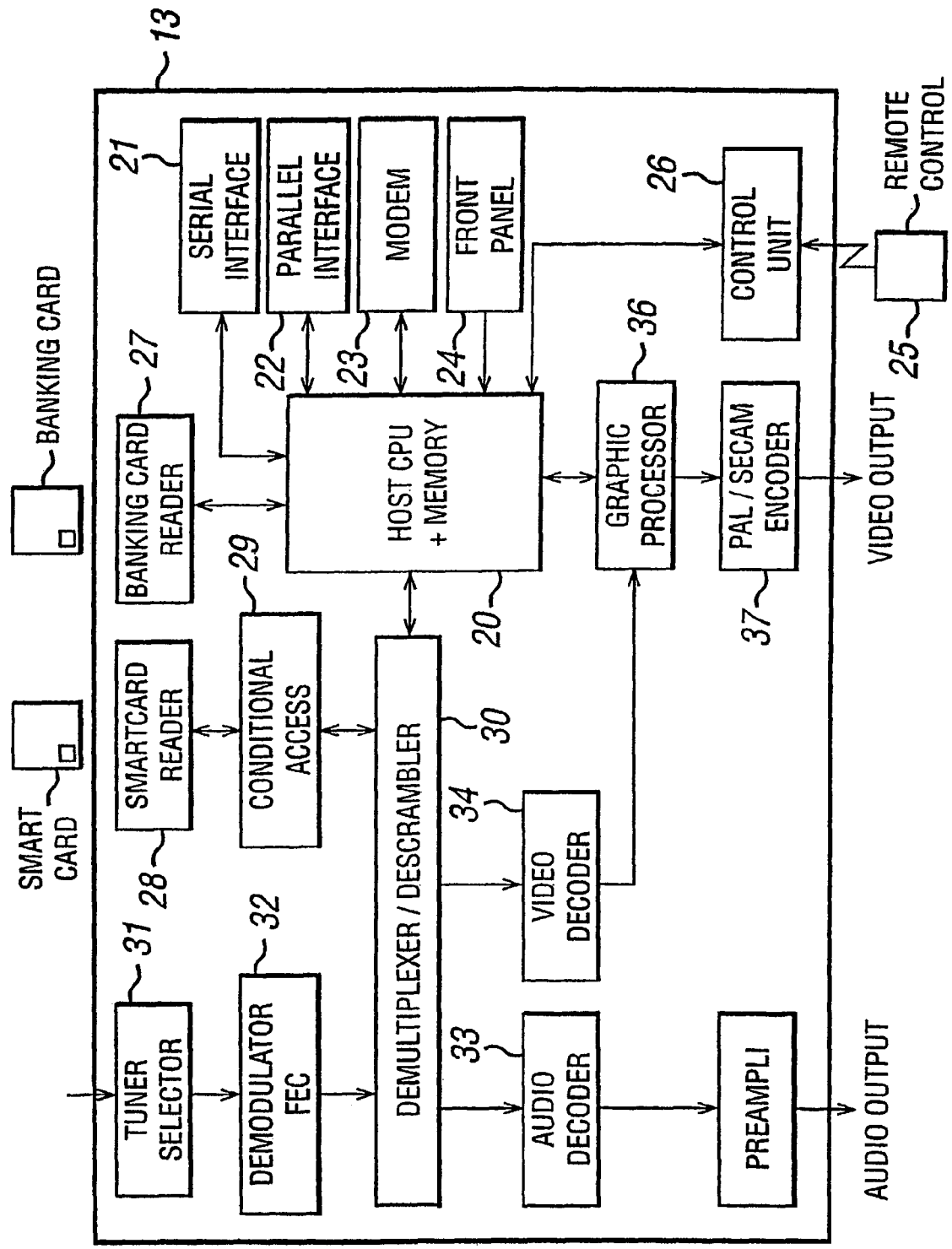
FIG. 3 is a schematic diagram of the structure of a receiver/decoder of the system of FIG. 1.

Referring to FIG. 3, the elements of the receiver/decoder 13 or set-top box will now be described. The elements shown in this figure will be described in terms of functional blocks.

The decoder 13 comprises a central processor 20 including associated memory elements and adapted to receive input data from a serial interface 21, a parallel interface 22, a modem 23 (connected to the modem back channel 17 of FIG. 1), and switch contacts 24 on the front panel of the decoder.

The decoder is additionally adapted to receive inputs from an infra-red remote control 25 via a control unit 26 and also possesses two smartcard readers 27, 28 adapted to read bank or subscription smartcards respectively. The subscription smartcard reader 28 engages with an inserted subscription card and with a conditional access unit 29 to supply the necessary control word to a demultiplexer/descrambler 30 to enable the encrypted broadcast signal to be descrambled.

The decoder also includes a conventional tuner 31 and demodulator 32 to receive and demodulate the satellite transmission before being filtered and demultiplexed by the unit 30.

Figure 4:
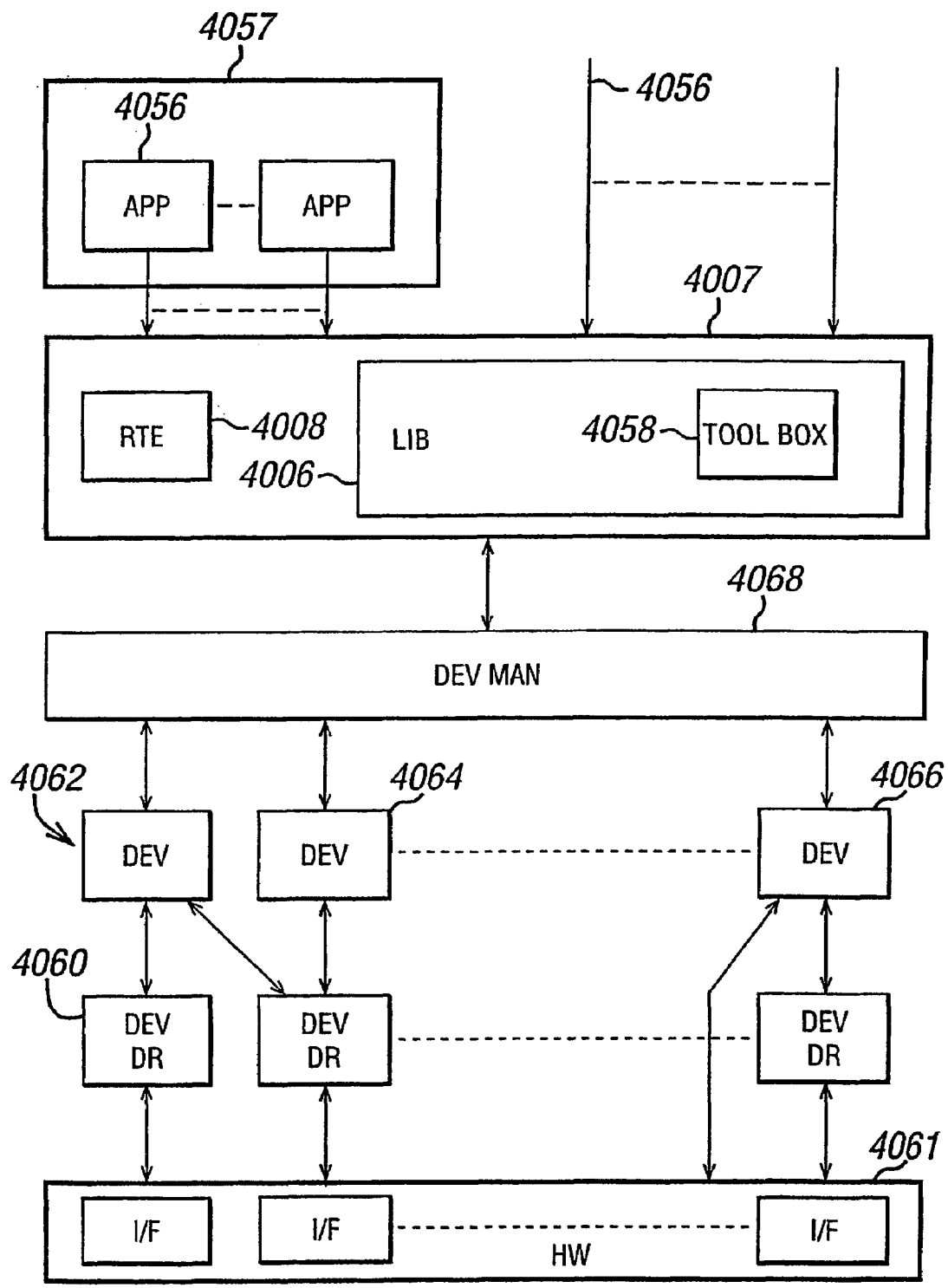
FIG. 4 is a functional block diagram of the layered architecture of the receiver/decoder.

Processing of data within the decoder is generally handled by the central processor 20. FIG. 4 illustrates the software architecture of the central processor 20 of the receiver/decoder. With reference to FIG. 4, the software architecture comprises a Run-Time-Engine 4008, a Device Manager 4068 and a plurality of Devices 4062 and Device Drivers for running one or more applications 4056.

As used in this description, an application is a piece of computer code for controlling high level functions of preferably the receiver/decoder 13. For example, when the end user positions the focus of remote control 25 on a button object seen on the screen of the television set 14 and presses a validation key, the instruction sequence associated with the button is run.

An interactive application proposes menus and executes commands at the request of the end user and provides data related to the purpose of the application. Applications may be either resident applications, that is, stored in the ROM (or FLASH or other non-volatile memory) of the receiver/decoder 13, or broadcast and downloaded into the RAM or FLASH memory of the receiver/decoder 13.

Applications are stored in memory locations in the receiver/decoder 13 and represented as resource files. The resource files comprise graphic object description unit files, variables block unit files, instruction sequence files, application files and data files, as described in more detail in the above-mentioned patent specifications.

The receiver/decoder contains memory divided into a RAM volume, a FLASH volume and a ROM volume, but this physical organization is distinct from the logical organization. The memory may further be divided into memory volumes associated with the various interfaces. From one point of view, the memory can be regarded as part of the hardware; from another point of view, the memory can be regarded as supporting or containing the whole of the system shown apart from the hardware.

The central processor 20 can be regarded as centred on a run time engine 4008 forming part of a virtual machine 4007. This is coupled to applications on one side (the "high level" side), and, on the other side (the "low level" side), via various intermediate logical units discussed below, to the receiver/decoder hardware 4061, comprising the various ports as discussed above (that is, for example, the serial interface 21, the parallel interface 22, modem 23, and control unit 26).

With specific reference to FIG. 4, various applications 4057 are coupled to the virtual machine 4007; some of the more commonly used applications may be more or less permanently resident in the system, as indicated at 4057, while others will be downloaded into the system, eg from the MPEG data stream or from other ports as required.

The virtual machine 4007 includes, in addition to the run time engine 4008, some resident library functions 4006 which include a toolbox 4058. The library contains miscellaneous functions in C language used by the engine 4008. These include data manipulation such as compression, expansion or comparison of data structures, line drawing, etc. The library 4006 also includes information about firmware in the receiver/decoder 13, such as hardware and software version numbers and available RAM space, and a function used when downloading a new Device 4062. Functions can be downloaded into the library, being stored in FLASH or RAM memory.

The run time engine 4008 is coupled to a Device manager 4068 which is coupled to a set of Devices 4062 which are coupled to Device drivers 4060 which are in turn coupled to the ports or interfaces. In broad terms, a Device driver can be regarded as defining a logical interface, so that two different Device drivers may be coupled to a common physical port. A Device will normally be coupled to more than one Device driver; if a Device is coupled to a single Device driver, the Device will normally be designed to incorporate the full functionality required for communication, so that the need for a separate Device driver is obviated. Certain Devices may communicate among themselves.

As will be described below, there are three forms of communication from the Devices 4064 up to the run time engine: by means of variables, buffers, and events which are passed to a set of event queues.

Each function of the receiver/decoder 13 is represented as a Device 4062 in the software architecture of the receiver/decoder 13. Devices can be either local or remote. Local Devices 4064 include smartcards, SCART connector signals, modems, serial and parallel interfaces, an MPEG video and audio player and an MPEG section and table extractor. Remote Devices 4066, executed in a remote location, differ from local Devices in that a port and procedure must be defined by the system authority or designer, rather than by a Device and Device driver provided and designed by the receiver/decoder manufacturer.

The run time engine 4008 runs under the control of a microprocessor and a common application programming interface. They are installed in every receiver/decoder 13 so that all receiver/decoders 13 are identical from the application point of view.

The engine 4008 runs applications 4056 on the receiver/decoder 13. It executes interactive applications 4056 and receives events from outside the receiver/decoder 13, displays graphics and text, calls Devices for services and uses functions of the library 4006 connected to the engine 4008 for specific computation.

The run time engine 4008 is an executable code installed in each receiver/decoder 13, and includes an interpreter for interpreting and running applications. The engine 4008 is adaptable to any operating system, including a single task operating system (such as MS-DOS). The engine 4008 is based on process sequencer units (which take various events such as a key press, to carry out various actions), and contains its own scheduler to manage event queues from the different hardware interfaces. It also handles the display of graphics and text. A process sequencer unit comprises a set of action-groups. Each event causes the process sequencer unit to move from its current action-group to another action-group in dependence on the character of the event, and to execute the actions of the new action-group.

The engine 4008 comprises a code loader to load and download applications 4056 into the receiver/decoder memory. Only the necessary code is loaded into the RAM or FLASH memory, in order to ensure optimal memory use. The downloaded data is verified by an authentication mechanism to prevent any modification of an application 4056 or the execution of any unauthorized application. The engine 4008 further comprises a decompressor. As the application code (a form of intermediate code) is compressed for space saving and fast downloading from the MPEG stream or via a built-in receiver/decoder mode, the code must be decompressed before loading it into the RAM. The engine 4008 also comprises an interpreter to interpret the application code to update various variable values and determine status changes, and an error checker.

Before using the services of any Device 4062, a program (such as an application instruction sequence) has to be declared as a "client", that is, a logical access-way to the Device 4062 or the Device manager 4068. The manager gives the client a client number which is referred to in all accesses to the Device. A Device 4062 can have several clients, the number of clients for each Device 4062 being specified depending on the type of Device 4062. A client is introduced to the Device Manager 4068 by a procedure "Device: Open Channel". This procedure assigns a client number to the client. A client can be taken out of the Device manager 4068 client list by a procedure "Device: Close Channel".

Access to Devices 4062 provided by the Device manager 4068 can be either synchronous or asynchronous. For synchronous access, a procedure "Device: Call" is used. This is a means of accessing data which is immediately available or a functionality which involves waiting for the desired response. For asynchronous access, a procedure "Device: I/O" is used. This is a means of accessing data which does not involve waiting for a response, for example scanning tuner frequencies to find a multiplex or getting back a table from the MPEG stream. When the requested result is available, an event is put in the queue of the engine to signal its arrival. A further procedure "Device: Event" provides a means of managing unexpected events.

The main loop of the run time engine is coupled to a variety of process sequencer units, and when the main loop encounters an appropriate event, control is temporarily transferred to one of the process sequencer units.

Examples of Devices 4062 to 4066 are MLOAD and TUNER. The MLOAD Device is used to download DVB sections from a transmitted data stream. The Application provides the PID (Program ID) that contains the sections to load, and filters to reduce the number of sections loaded to only those sections of interest to the application.

The TUNER Device is used to request information about the set top box tuner, to read the tuner status (AGC, BER, etc) and to set and get the tuning parameters. This Device also allows frequency-scanning operations.

Application Authoring Tool

Figure 5:
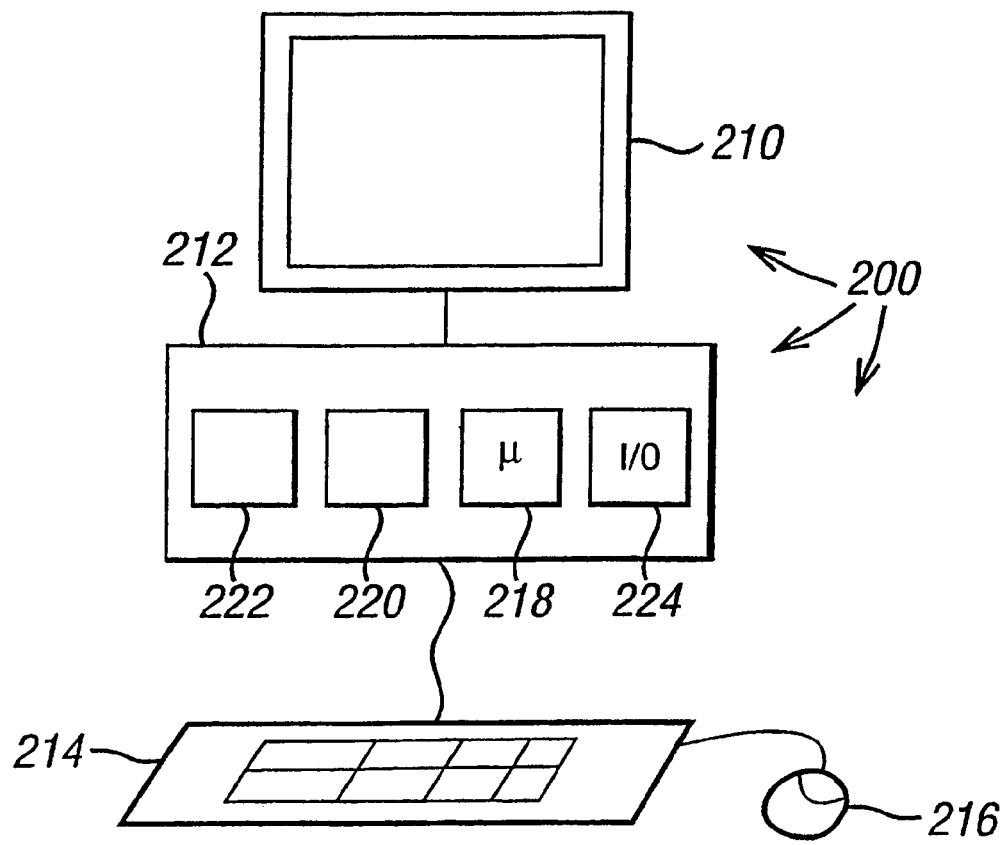
FIG. 5 shows a workstation for running an application authoring tool.

As mentioned above, authoring tool 4004 is provided to enable applications to be designed, created, tested and debugged. The authoring tool is run on a workstation (WS), such as a personal computer (PC) running Windows NT, Windows 95 or Windows 98, or a UNIX machine, or a workstation running any other operating system, and is used to create and edit the resource files and data files which make up the application. Referring to FIG. 5, workstation 200 comprises screen 210, computer 212, keyboard 214 and mouse 216. Computer 212 comprises a processor 218, memory 220, hard disk 222, input/output (I/O) ports 224, as well as other pieces of hardware and software that are conventional in such computers.

Figure 6:
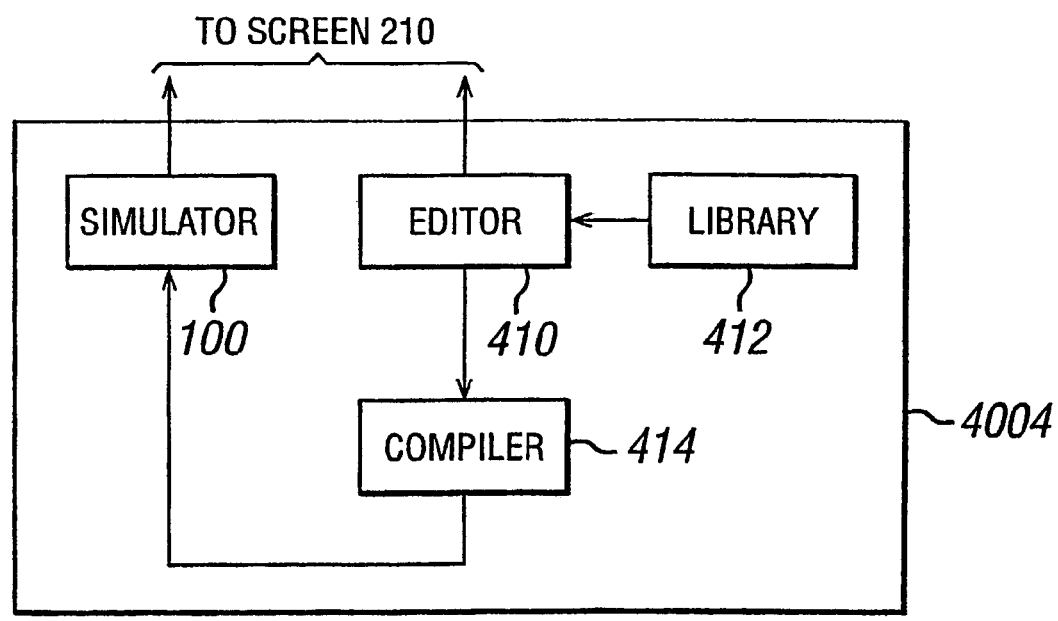
FIG. 6 shows the main elements of an authoring tool.

An overview of authoring tool 4004, which runs on workstation 200, is shown in FIG. 6. Authoring tool 4004 comprises an editor 410 for creating and editing the various files that make up an application, library 412 which stores existing files for use by the editor 410, compiler 414 for compiling files which have been produced by editor 410 into the intermediate language which can be understood by a virtual machine, such as virtual machine 4007 in FIG. 4, and a simulator 100, which is used to simulate the behaviour of a receiver/decoder in order to test and debug applications, as will be described below.

An application comprises resource files, which contain instructions written in an intermediate language designed for a virtual machine, and, optionally, data files, which contain data which is to be used by the application. An application may comprise one of more of the following types of resource files:

module files—to define the entry points of the application
panel files—to define the screens
class files—to define the data structures used by the application
script files—to define the behaviour of the application
Examples of data files are as follows:
icon library files—these contain a collection of 4 bits per pixel bitmaps up to a maximum size of 80×64 pixels. These icons can be used by the panels as buttons or as decoration.
images—these files contain a single bitmap of any size with four bits per pixel, giving sixteen colours. This type of image is typically used as a background to a panel.
colour tables—these are used to define the colours which a module can display on the screen.
user data files—these files are defined by the user for use by the application. They are ASCII text files or binary data files.

In use, an application developer makes use of existing files which are stored in the library 412, to produce files which are customised for his application, using the editor 410. Files which are being edited are displayed on the workstation screen 210 and changes are entered using keyboard 214 and mouse 216. The files may be displayed in various ways; for example graphic files may be displayed as graphics on the screen, whereas for resource files, the code in the files may be displayed, or a representation of the overall structure or architecture of the code may be displayed.

Once an application has been created, it is converted into the intermediate language which can be understood by a virtual machine via a compiler 414.

In order to subject the application to initial testing, the workstation is provided with a simulator 100, which simulates the behaviour of a receiver/decoder, so that the application can be tested on the workstation 200 without being downloaded to a real receiver/decoder. This enables an application to be tested immediately, and avoids the need to provide a receiver/decoder and associated hardware. Although the simulator provides an execution environment that approximates that of a receiver/decoder, and is therefore very useful in order to ensure that the application functions broadly correctly, the simulation cannot be entirely accurate. There is always the possibility that the application, will behave differently from how it would behave in an actual receiver/decoder. Therefore, in the present embodiment, the application is subjected to additional testing on a receiver/decoder as will be described in detail, in due course. Note, however, that the use of a simulator is not an essential feature of the invention. Testing and debugging of the application may take place entirely in a receiver/decoder or in a receiver/decoder in combination with another testing and/or debugging system.

A Debugging Terminal for Testing an Application

In the embodiment of the invention, a debugging terminal is provided that can be used to test an application in an environment that very closely corresponds to the environment in which the application will execute while in normal use. This environment must provide not only hardware and software that corresponds to that of the target environment, it must also emulate the effect of receiving a broadcast signal that includes PIDs that carry executable code and data for the application. This is achieved by providing a bitstream simulator in the terminal to simulate relevant parts of the data stream that a receiver/decoder derives from a received broadcast signal.

More particularly, the bitstream simulator is operative to enable the Device MLOAD to satisfy (or, indeed, fail to satisfy) requests for data from the RTE 4008 as if the terminal were receiving a broadcast signal upon which the application under test had already been enabled.

In order to function as a debugging terminal, the hardware and software of a conventional receiver/decoder must be subject to a surprisingly small amount of change. In respect of the hardware, no changes may be required at all; although more RAM is required than the minimum amount specified by the relevant manufacturing standard for receiver/decoders, many existing receiver/decoders have already been provided with sufficient additional RAM (due to certain economies of scale on the part of the receiver/decoder manufacturers). The terminal must also have a serial port, but this is already provided as standard on receiver/decoders. The software of the terminal is substantially the same as the software in a production receiver/decoder, with appropriate modifications dedicated to bitstream simulation.

Figure 7:
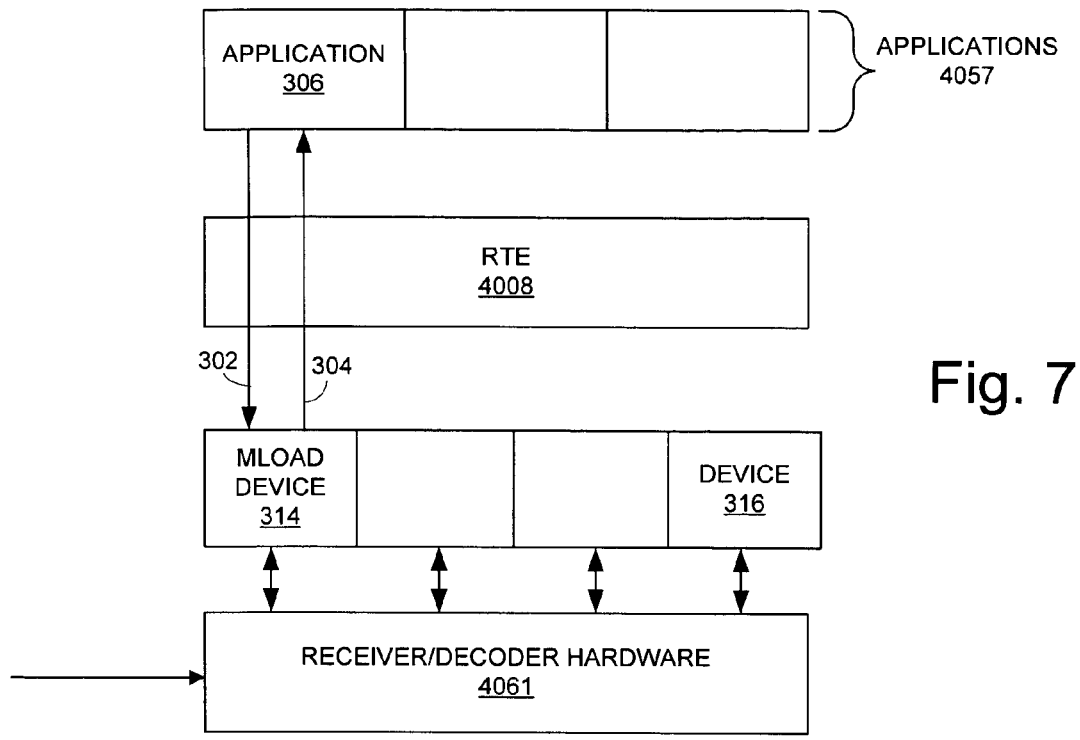
FIG. 7 illustrates the communication between an application and a device.

With reference to FIG. 7, as described briefly above, an application 306 running in an unmodified receiver/decoder may send a request to the devices using a special interface in the run time engine 4008. Similarly, the run time engine also forwards information in the opposite direction from devices to an application 306.

Specifically in the case of the MLOAD device 314, an application sends a request 302 to the MLOAD device 314 containing a description of the data, contained within an MPEG table or section, which it requires from the broadcast signal.

The MLOAD device 314 then interacts with the hardware 4061 to cause it to scan the broadcast signal for the MPEG section or table which meets the specified criteria, and when the section or table is found (if a time-out has not occurred in the meantime), the MLOAD device 314 sends the requested data 304 back to the application 306.

With reference to FIG. 8, the modification of the software can be considered to insert an additional software layer 300 between the RTE 4008 and the devices. This additional layer intercepts data passing between the RTE 4008 and the devices.

In some cases, the additional layer 300 is effectively 'transparent' and passes a request 310 from an application 308 to a device 316 below it. The response 312 from the device also passes back to the application 308 via the additional layer 300 and RTE 4008.

In other cases, the additional layer 300 generates a response 322 itself to the request 320 and returns the response to the application 306 via the RTE 4008. As such, the additional layer 300 acts as a virtual device with which the RTE 4008 can communicate, and effectively bypasses the device 314 to which the request was directed. The response 306 may be derived from the cache 318 which is accessible to the additional layer 300.

The request may alternatively be issued by the RTE 4008 itself, or other parts of the system, in which case the above still applies, except that the response is sent to the device which issued the request.

From the point of view of a developer, one cannot consider a specific development without looking at the hardware as well as the software.

In order to simulate a bitstream, loading requests to the MLOAD Device, as described above, are redirected via a local handler comprising a memory cache that contains pre-loaded tables and sections.

These tables and sections may correspond to those that will be present in the broadcast signal once the application has been deployed, but which are not present in the broadcast signal at the time of development and testing of the application. This software layer 300 makes up the bitstream simulator in the terminal.

The implementation follows the following principle, and is illustrated diagrammatically in FIG. 9:

A 'bitstream generator' tool on the workstation side 1310 permits the creation of a static bitstream, its storage in memory 1314 of the terminal 1312, and the control of its dynamics. The bitstream generator 1310 executes as an application on the workstation, typically including a graphical user interface for interaction with a user.

The application allows a user to select data to be downloaded to the terminal to provide data for the virtual PIDs, and to select parameters to control operation of the terminal, and generally to select all of the options discussed below.

Once the communication protocol has been defined, and the database format specified, the workstation can be replaced by a PC 1410, as shown in FIG. 10, for use with other test applications or for integration purposes. In this case, the role of the PC 1410 consists of loading the static bitstream (created on the workstation), and managing the test process, by means of a specific application.

A functional specification will now be given.

Creation of Tables and Sections

A tool, which can be used with the 'Bitstream Generator', permits the creation of MPEG sections and tables that are used by the application. The collection of tables and sections makes up a database stored on the workstation. This data can be used in other work.

It is possible to recover tables or sections generated by an external tool (MkTab or MediaTab for example). Format conversion tools can be used.

Static Construction of the Bitstream

Virtual Transponders

The simulated bitstream appears in the form of one or more virtual transponders. The virtual transponders have an identical structure to real transponders, but may only support MPEG tables or sections.

When the transponder is created, the developer can assign certain parameters, such as frequency, polarisation etc. The frequency characterises a particular transponder.

It is the responsibility of the developer to define the tables used for the description of a virtual transponder (NIT, PAT, PMT . . . ) if necessary (nevertheless, the tool may offer certain facilities, for example, the creation of a transponder can drive the creation and the updating of the tables).

Virtual PIDs

After having created a transponder, one attributes to it the PIDs that receive the MPEG sections and tables. The number of PIDs that a transponder can have must be specified in advance. This number should be sufficient to cover the eventual number of PIDs that will be added during the session, which cannot be determined in advance. The virtual PIDs are identified by their number, which is unique within each transponder.

Number of Hardware Filters

It is possible to specify the maximum number of hardware filters useable with the same PID. This option can be used for the setting up of an application. This option exists in order to simulate the MLOAD device more accurately, and reflects the limitation on the number of hardware filters which may concurrently be used with the real MLOAD device.

Attribution of Tables and Sections

Once the PIDs have been defined, it is possible to attribute tables and sections to them. The same table or section can be attributed to several PIDs of several transponders.

The number of sections that a PID can contain must be specified in advance, this number should be sufficient to cover the eventual number of sections that will be added during the session, which cannot be determined in advance.

Transponder Association

The idea of association is important as it permits data broadcast over the real stream and the virtual stream to be used at the same time.

A virtual transponder corresponds to a virtual frequency to which one can tune. Given that this is virtual tuning, it is possible to tune the terminal to a real transponder at the same time, offering the possibility of adding video, audio etc., or of loading real tables and sections, whilst retaining the loaded tables on the virtual transponder. Similarly, if the tuner is on a real frequency, it is possible via an association to load data, not from a real stream, but from a virtual stream.

During the construction of a data stream, it is possible to define a collection of associations:

a virtual transponder is associated with a real transponder (one and one only) for the virtual PIDs of a virtual transponder it is possible to associate one and only one real PID of a real transponder.

a real transponder is associated with a virtual transponder (one and only one) for the real PIDs of real transponders it is possible to associate one and only one virtual PID of a virtual transponder.

The defined associations cannot be modified in the course of a simulation and they are differentiated in the following manner:

If the tuning frequency is a virtual frequency, it is a virtual transponder corresponding to a real transponder. If for this virtual PID an association is defined, the download can be carried out on the real PID. Otherwise, the loading PID will be a virtual PID.

If the tuning frequency is a real frequency, it is a real transponder associated with a virtual transponder. If for this real PID an association is defined, the download can be carried out on the virtual PID. Otherwise, the loading PID will be a real PID.

The associations 'real-virtual' and 'virtual-real' are independent options that are taken into account at the level of the PIDs of the transponders.

'Real-Virtual' Association

This association is taken into account (if requested by the user) when tuned to a real transponder. If there is an association of a real PID with a virtual PID, then all requests for loading will be carried out in the associated PID of the virtual transponder, and not in the real PID as would be the case if there were no association.

'Virtual-Real' Association

This association is taken into account (if requested by the user) when tuned to a virtual transponder. If there is an association of a virtual PID with a real PID, then all requests for loading will be carried out with the associated PID of the real transponder, and not with the virtual PID as would be the case if there were no association.

Virtual Priority: The 'VPriority' Flag

During the construction of a stream, it is also possible to define for each of the virtual PIDs a priority of loading called the virtual priority. This is indicated by setting the VPRIORITY flag. This priority permits one to carry out the loading on the virtual PID if at least one MPEG section present and activated matches the filtering criteria. If not the loading will be done on the real PID.

In other words, VPRIORITY is an option that enables refinement of the loading rules in the case of an association. The rule followed is that when loading using a PID for which there exists an association, there is an attempt to load the data using the virtual PID. If an association is not present then an attempt is made to load from the real stream rather than generating a TIME-OUT error.

This rule is valid whether the tuning is to a real transponder or a virtual transponder.

The virtual priority flag is accepted if an association is defined.

More specifically, if, according to the associations, the eventual PID of the loading is a virtual PID, and if for this PID the virtual priority flag is valid:

Loading is carried out on the virtual PID if at least one MPEG section which is present and activated matches the filtering criteria given in the MLOAD command. A loading request for a group of MPEG sections will be carried out if at least one MPEG section is present and activated and matches the filtering criteria for the SDG section Or The loading is carried out on the real PID Or The loading is suspended (time out)

If following the associations, the eventual PID of loading is a virtual PID, and if for this PID the virtual priority flag is invalid:

The loading is carried out on the virtual PID

Or

The loading is suspended (time out)

In contrast to associations, it is possible to validate or invalidate any virtual priority flag setting while a simulation is in progress.

Loading PID

The loading PID corresponds to the PID upon which loading is effective. The data contained in the PID is represented in Table 1 below:

TABLE 1

| Transponder tuned in | Associated transponder | PID IO_Cmd | Associated PID | Loading PID |
|---|---|---|---|---|
| Real | Not defined | Real | Not defined | Real |
| Real | Active virtual | Real | Not defined | Real |
| Real | Inactive virtual | Real | Not defined | Real |
| Real | Active virtual | Real | Active Virtual Priority Virtual TRUE | Virtual if an MPEG section is present; Real if not |
| Real | Active virtual | Real | Active Virtual Priority Virtual FALSE | Virtual |
| Real | Active virtual | Real | Active Virtual Priority Virtual TRUE/FALSE | Time out |
| Real | Inactive virtual | Real | Active Virtual Priority Virtual TRUE/FALSE | Time out |
| Real | Inactive virtual | Real | Inactive Virtual Priority Virtual TRUE/FALSE | Time out |
| Active virtual | Not defined | Active Virtual Priority Virtual TRUE/FALSE | Not defined | Virtual |
| Active virtual | Not defined | Inactive Virtual Priority Virtual TRUE/FALSE | Not defined | Time out |
| Active virtual | Real | Active Virtual Priority Virtual TRUE | Real | Virtual if an MPEG section is present and active; Real if not |
| Active virtual | Real | Active Virtual Priority Virtual FALSE | Real | Real |
| Inactive virtual | Not important | Not important | Not important | Time out |

Inserting, Deleting, and Replacing Data in a Downloaded Data-Stream

It is possible in the course of a data-stream simulation:
To insert a virtual PID
To insert, to delete, and to replace an MPEG table (all sections of the table)
To insert, to delete, and to replace an orphaned MPEG section These procedures will now be discussed in further detail.

Insertion

A newly inserted and activated virtual PID, table or section must be taken into account in current and future loadings. If the inserted virtual PID, table or section is in the deactivated state, it will not be included.

Deletion

The current and forthcoming loadings of MPEG tables and MPEG sections flagged "Deleted" are suspended. All the loadings will be abandoned. For non-abandoned loadings with a non-zero time-out value, the error message E_TIME_OUT will be posted at the end of loading. In the cache memory, the allocated memory buffers are freed.

Replacement

The replacement of an MPEG table or MPEG section consists of deleting the data to be replaced and inserting the replacement data.

Loading of an MPEG Section

For a section to be loaded, it is necessary that the section matches the filter criteria given in the MLOAD command, and, also that the loading time for the section occurs between the time of the issuance of the MLOAD command and the time-out time of the loading (if not zero).

For this to happen, amongst the activated sections of the virtual PID of the loading, it is necessary to:
Compare the bytes 0 and 3 to 9 of the sections to the hardware filter criteria (if not nil) of the MLOAD command
Compare the 8 adjacent bytes of the sections to the software filter criteria (if not nil) of the MLOAD command
Calculate the time of the loading of the sections, that correspond to the filter criteria. The section with the smallest loading time will be loaded. For this, a timer will be programmed to simulate the loading time of the section
Note that for a nil hardware filter, no section can be loaded.

Hardware Filter

The hardware filter criteria are made up of the values HARD_FILTER_VAL and HARD_FILTER_MSK passed in the MLOAD command as shown in Table 2:

TABLE 2

| 0 | 1 | 2 | 3 | 4 | 5 | 6 | 7 | 8 | 9 |   |
|---|---|---|---|---|---|---|---|---|---|---|
| 08 |   |   | A2 | F3 | 34 | 01 | 4D | 12 | EA | HARD_FILTER_VAL |
| 49 |   |   | FF | FF | 00 | FF | FF | 00 | EA | HARD_FILTER_MSK |

The value of the filter HARD_FILTER_VAL indicates the expected value for each bit selected in the filter mask profile HARD_FILTER_MSK. Where, for example, for the byte 0.

TABLE 3

| 0 | 0 | 0 | 0 | 1 | 0 | 0 | 0 | HARD_FILTER_VAL |
|---|---|---|---|---|---|---|---|---|
| 0 | 1 | 0 | 0 | 1 | 0 | 0 | 1 | HARD_FILTER_MSK |
| 1 | 0 | 1 | 0 | 1 | 0 | 1 | 0 | -> 0xAA:OK |
| 1 | 1 | 0 | 0 | 1 | 0 | 1 | 0 | -> 0xCA:KO |

To know whether a section corresponds to the filter criteria, it is necessary to perform the following operations on the nine bytes:

MPEG Section Byte XNOR Byte HARD_FILTER_VAL=Result byte

Result byte AND Byte HARD_FILTER_MSK=Result' byte

Result' byte must be equal to HARD_FILTER_MSK

EXAMPLE

| For the byte OK | For the byte KO |
|---|---|
| 0xAA XNOR 0x08 = 0x5D | 0xCA XNOR 0x08 = 0x3D |
| 0x5D AND 0x49 = 0x49 (equal to HARD_FILTER_MSK) | 0x3D AND 0x49 = 0x09 (different from HARD_FILTER_MSK) |

Software Filter

The software filter criteria are made up of the values SOFT_FILTER_VAL and SOFT_FILTER_MSK passed in the MLOAD command. For the software filter, it is a matter of comparing the 8 bytes adjacent to an offset, SOFT_FILTER_OFFSET that begins at byte 0 of the section. The comparison to the software filter criteria is only made if the section has been selected using the hardware filter criteria and if the value of SOFT_FILTER_MSK is not zero.

The principle of the software filter is the same as that of the hardware filter.

Loading Time

With reference to FIG. 13, a loading sequence will now be described. An MLOAD request occurs at a time T_MLOAD, indicated at 1710. The section is loaded at a time T_Load, indicated at 1712. The load request timeout occurs at T_Time_Out, indicated at 1714. The loading time window is indicated at 1716. If the timeout value is nil, then this window is infinitely long. Additional values are T_Cycle, representing the duration of the cycle in ms of the section, and T_0 is the time of first transmission of the section.

To find out which is the first activated MPEG section to be loaded amongst those on the virtual PID, it is necessary to calculate the loading time for each, and to select that which has the shortest time.

Where: T_Load=T_Cycle−(T_MLOAD−T_0) MOD T_Cycle

If T_Time_Out is not zero, then the section can be loaded if T_Load<T_Time_Out.

According to the loading time mode (see below):

If "best": The selected section is loaded immediately (T_Load=0)

If "worse": The loading time is equal to the cycle time of the selected section (T_Load =T_Cycle)

If "normal": The loading time for the section is respected

If possible, it will be necessary to subtract from T_Load the search time of the section for the section loading time to be established more accurately. A delay will be set with T_Load; the occurrence of the event associated with the delay will be the loading time of the section.

For the services MLOAD_SECTION_ALL, MLOAD_TABLE_LOAD and MLOAD_GROUP_LOAD, the occurrence of the event associated with the loading of the first section, the next section to be loaded will be looked for once more amongst all the active sections of the virtual PID, and a new delay will be set, and this will be repeated for as many times as there are sections to be loaded. The fact of running through all the sections searching for the next section to be loaded, for each loading, allows one to take into account any insertions, deletions, replacements, activations, and deactivations amongst the sections that may possibly be loaded.

In order to avoid a saturation of MLOAD events, the "best" and "worse" modes will not be taken into account for the following services:

MLOAD_SECTION_ALL
MLOAD_GROUP_LOAD
MLOAD_TABLE_LOAD with EVENT_MODE equal to 0x01 (MLOAD event sent for each loaded MPEG section)

During the simulation, it will be possible to modify the cycle time, the time of the first broadcast, and the loading mode for an orphan section and a table.

Time Out

For each loading request on a virtual PID, a delay will be programmed for the time out if this is non-zero and if the service is different from MLOAD_SECTION_ALL.

The occurrence of the event associated with a delay will correspond to the time-out of the loading; the loading will be halted and an event posted (E_TIME_OUT). If a delay has been programmed for the loading of a section then this will be reprogrammed.

Cache Memory

The cache memory corresponds to a supplementary memory area in certain decoders that is not managed by the operating software. This memory area will be used for the storage of the stream.

The cache memory is represented by a buffer broken up into memory blocks of 64 bytes, and this buffer can equally be divided into two zones called 'low memory' and 'high memory'.

Only the free space of the cache memory is managed and is arranged as a list of free blocks, called holes. Each hole is made up of a size (in blocks of 64 bytes), a pointer to the next block and the available space. The holes are stored in ascending order of the memory addresses, and the last hole points to the first.

When a command is carried out, the list of holes is run through until a sufficiently large hole is found ('first fit' method). If the hole has exactly the required size, it is withdrawn from the list (becoming a buffer) and its address is returned. If the hole is too big, only the size required is returned and the remainder of the hole remains on the list. If no hole is available, an allocation error is returned.

If the cache memory is divided into two memory zones (low and high), then for an allocation in low memory the list of holes will be run through from the first hole up to the hole at the border between the two zones. For an allocation in high memory the list will be run through from the last hole down to the hole at the border between the two zones.

Regarding the freeing of a buffer, the list of holes is again run through to know at what position the new hole will be inserted. If the new hole is next to an existing hole, the two holes are combined, forming a hole of greater size and reducing the extent of fragmentation. This combination is possible thanks to the ascending order of the addresses of the holes in the list.

A hole is therefore formed with a pointer to the following hole in the list and the size, in blocks of 64 bytes, both grouped in a header. To avoid problems of alignment, these two pieces of data will be of long type (8 bytes per heading).

Before proceeding to the first allocation, it is necessary firstly to initialise the cache memory by calling a function, init. Then, the allocation of a buffer in the memory will be made by calling a function, malloc, that reserves <n> blocks of 64 bytes of a size superior to, or equal to, the requested size. The calling of a function, free, will permit the freeing of a buffer previously allocated by malloc. The calling of malloc and free can be made in any order.

Structure of a Buffer in the Cache Memory

An allocated buffer in the cache memory is made up of:
The header, which is made up of two fields (used by the functions malloc and free):
  The first field contains the address of the memory space returned by malloc
  The second field contains the size, in blocks of 64 bytes, of the memory space
The memory space returned by malloc
  This structure is represented in Table 4.

TABLE 4

| Address returned by malloc | Size (number of blocks) | <- Address returned by malloc |
|---|---|---|
| Header | | Memory space |

Structure of a Hole in the Cache Memory

A hole in the cache memory is made up of two parts:
The header, which is made up of two fields (used by the functions malloc and free):
  The first field contains the address of the following hole
  The second field contains the size of the hole in blocks of 64 bytes
The free memory space
  This structure is represented in Table 5.

TABLE 5

| Pointer to the next hole | Size of the hole (number of blocks) | <-Address of the hole |
|---|---|---|
| Header of the hole | | Free memory space |

Init

The function init calculates the number of useable blocks of 64 bytes in the buffer up to the boundary of the low memory and high memory if the memory is divided, and finishes by initiating the list of holes as containing just a single hole.

For the bitstream simulator, the high memory is null. Only the low memory is used (all cache memory).

Malloc

The function malloc returns a pointer that points to a buffer made up of blocks of 64 bytes whose size is greater than or equal to the size given in the argument.

For an allocation request, malloc runs through the list of holes to determine the first hole that is sufficiently large to contain the buffer ('first fit' method). This hole is removed from the list and returned. If the hole is too large, it is divided and the end of this hole makes up the buffer; the remainder of the hole remains on the list.

The pointer, returned by malloc, points to the memory space that begins just after the header.

In the case of an allocation in the low memory area, malloc runs through the list of holes in the ascending order of the addresses up to the border between the memory areas. For an allocation in the high memory area, the list is run through in descending order of the addresses down to the border between the memory areas.

Free

The function free makes available for the next use of the malloc function, the blocks making up the buffer for which the address is passed in an argument (address returned by malloc).

To verify if the address given is truly the allocated address in the cache memory, it is necessary to subtract from this address the size of the header to point to the header and compare the first field of this header to the address given in the argument.

The freeing of a buffer implies a search in the list of holes in order to find the site where it is necessary to insert the new hole. If the hole is located just next to another hole, or between two holes, the two or three holes are combined to form a single hole.

Using the TCS and TPT

In the case where the application is developed with Mediastart (as supplied by Canal+SA), the user can use knowledge of the TCS (Table de Coordonnees de Service/ Service Coordinates Table) and of the TPT (Table des Parameters de Tuning/Tuning Parameters Table) to enable the associations of the transponders. The TCS is a private table including service numbers and titles, and the TPT is a private table including tuning-related data.

Using the PMT

The VPRIORITY option allows the separation of the application and the broadcast data. It is useful to send, information relative to the type of data to the bitstream generator, after analysis of the PMT.

Construction of a Virtual Directory

With a combination of Association and VPRIORITY, as discussed above, it is possible to load virtual application modules (from a virtual stream) and real modules (broadcast on the corresponding real PID). The bitstream generator permits the creation of a directory containing references to real and virtual modules. It becomes possible to mix broadcast and virtual applications, to replace real modules by an alternative virtual version, etc.

To assist the user, the directory found on the real PID is reloaded so allowing knowledge of the modules it contains.

The new virtual directory is authenticated with a private key present on the workstation.

Definition of the Dynamic Stream Parameters

TID, TID Ext

It is possible to modify the TID of a section, and the TID Ext of a table (ie the collection of sections of a table). The value of the Hardware Filter Value corresponding to the loading of a table. (section) is indicated when the table is selected.

Cycle Time

To each section making up the stream, there is attributed a cycle time in time units of 10 ms. The bitstream simulator uses this data to determine if the section is able to be loaded, as a function of the time of the MLOAD request and the associated time-out For a table it is possible to define the cycle time of the table, or the inter-section time if it is broadcast in regular mode (as defined below).

Time of First Broadcast

A first broadcast time is assigned to each section with respect to the time zero T0 at the start of the stream. The time origin T0 corresponds with the launching of the development software. FIG. 11 is a timing diagram illustrating this.

In the first instance it falls to the user to define this time. In a more sophisticated version of the tool, this parameter will be calculated as a function of the data on the virtual transponder.

'Burst' or 'Regular' Mode

Figure 12A:
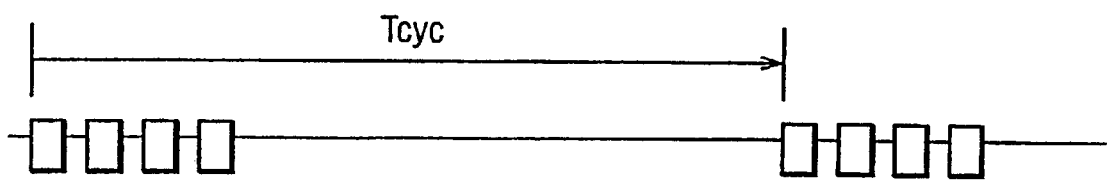
Figure 12B:
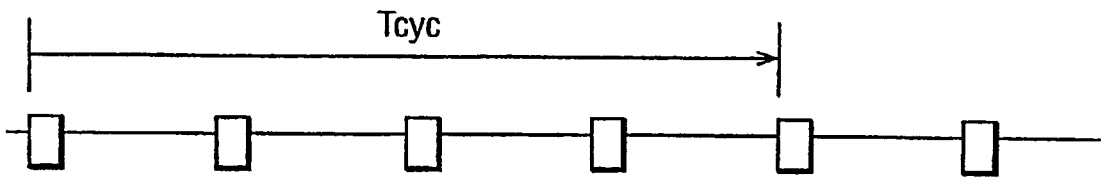

Two modes of broadcast are possible for the tables:

Burst mode, as illustrated in FIG. 12A: all sections of the table are loaded continuously. It is not necessary to wait a complete cycle time to load the table Regular mode, as illustrated in FIG. 12B: the sections are divided in time as a function of the cycle time assigned to the table. The loading of the table is done at regular intervals over one cycle time Activation/Deactivation An activation/deactivation (enabled/disabled) option exists for the transponders, PID, sections, tables, and table sections.

If an element is activated, it is 'visible' to the MLOAD command. If it is deactivated, it is not visible, but is present in the memory. It is thus possible to make a stream from a transponder, a PID, a table, or a section 'appear' or 'disappear' without having to transfer data between the workstation and the terminal.

If an element is deactivated, all the elements that make up that element are also deactivated. The order of priority is as follows:

Transponder
  PID
    Section not belonging to a table (short format header)
    Table
      Section belonging to a table (long format header)

This option can be set statically (upon the construction of the stream) or later, dynamically during a simulation session, as will be described below.

Activation and Deactivation of a Virtual Transponder

When a tuned virtual transponder passes from the activated state to the deactivated state, the loadings in progress and to come for this transponder are suspended. All of the loadings can be abandoned. For the loadings that have not been abandoned, with a non-zero time out, the error message E_TIME_OUT will be posted at the conclusion of the loading.

When the tuned virtual transponder passes from the deactivated to the activated state, the suspended loadings will be recovered and those to come will be valid.

Activating or deactivating a virtual transponder does not affect the state of the PIDs, the tables or the sections connected with the transponder.

It should be noted that deactivating a tuned-in virtual transponder effectively simulates a loss of carrier. Similarly, it is not possible to tune into a virtual transponder in the deactivated state.

Activation and Deactivation of a Virtual PID

When a tuned-in virtual PID passes from the activated state to the deactivated state, any loadings in progress and to come for the PID are suspended. All of the loadings can be abandoned. For the loadings that have not been abandoned, with a non-zero time out, the error message E_TIME_OUT will be posted at the conclusion of the loading.

When the tuned-in virtual PID passes from the deactivated to the activated state, the suspended loadings will be resumed and those to come will be valid.

Activating or deactivating a virtual PID does not affect the state of the tables and the orphaned sections connected with this PID.

Activation and Deactivation of an MPEG Table

When a table is in the deactivated state, the table sections will not be included in the future loadings of the table. When a table passes into the deactivated state, the table sections must be taken into account in the current or future loadings of the table. All the loadings can be abandoned. For the loadings that have not been abandoned, with a non-zero time out, the error message E_TIME_OUT will be posted at the conclusion of the loading.

In contrast, when the table becomes activated, the sections of the table becoming activated must be taken into account in current and future loadings of the table.

Deactivating an MPEG table deactivates all sections of the table. The sections return to the active state if the table returns to the active state.

Activation and Deactivation of an MPEG Section

A deactivated section will not be taken into account in the current or future loadings. All the loadings can be abandoned. For the loadings that have not been abandoned, with a non-zero time out, the error message E_TIME_OUT will be posted at the conclusion of the loading.

In contrast, when a section returns to the activated state, it must be taken into account in current and future loadings.

Loading Time Option

To verify the behaviour of an application as a function of the response time of the MLOAD Device, it is possible to simulate independently for tables and sections a systematic loading delay corresponding to a cycle time or to an intermediate loading:

This example supports three loading time options:
  Best: the table/section is loaded immediately
  Norm: the table/section is loaded after a delay that depends on the cycle time
  Worse: the table/section is loaded after a cycle time The 'best' and 'worst' modes only have a meaning for MLOAD_TABLE with mode=0, and for MLOAD_SECTION, and are only taken into account for loading requests.

Simulation

Simulation Session

A simulation session begins with downloading of the bitstream to the terminal from the workstation. In this embodiment, it is not possible subsequently to change the stream (the contents of the cache) without applying a RESET to the terminal. The implementation imposes a permanent synchronisation between the real MLOAD Device and the bitstream simulator at the initialization of the terminal.

Initialisation of the Bit-Stream Simulator

On power-up, or upon switching on the decoder, the bit-stream simulator will initialise the data. If there is a problem during the initialisation all requests for loadings will be carried out by the real MLOAD Device.

Launching of the Bit-Stream Simulator

The bit-stream simulator will be active when a data stream is present in the cache memory (downloading complete). Otherwise, all of the loading requests will be carried out by the real MLOAD Device.

Mload Device

All the commands of the MLOAD Device are simulated.

Tuner Device

Tuning

The simulated bitstream is accessible via the TUNER Device in the same way as for the real bitstream. When the static bitstream is constructed, the user can specify the tuning parameters corresponding to each virtual transponder. To access a virtual transponder all that need be done is to tune with the corresponding parameters.

In the case where the bitstream has not been previously loaded into the cache memory, a loss of carrier message is returned to the application.

Scanning

If the scanning of a frequency band is requested when the bitstream simulation is in progress, the various virtual carriers will be taken as being at the start of the band, that is, before the real carriers. The parameters returned by the TUNER Device are those defined upon construction of the static stream.

In this embodiment, it is the responsibility of the developer to supply the various normalised tables (NIT, CIT . . . ) needed by Mediastart. In alternative embodiments, the system will construct the normalised tables automatically given various parameters (channel name, and so on).

Virtual-Real Association

In the case of a virtual-real association, the tuner Device is tuned to the a real frequency if the application requests to be tuned to a virtual frequency.

Loss of Carrier

The behaviour is as follows, according to whether the tuner is tuned to a real or virtual transponder, with association:

If the TUNER is on a real frequency which is associated with a virtual transponder, then the virtual transponder inherits the characteristics of the real transponder:

loss of carrier of real transponder—the virtual transponder is INACTIVE. All the loadings in progress on the virtual transponder time out appearance of carrier of real transponder—the virtual transponder is ACTIVE. All the old suspended loadings and not yet timed out on the virtual transponder are recovered If the TUNER is on a virtual frequency that is associated with a real transponder:

Loss of virtual carrier—all the loadings in progress (virtual) are suspended (waiting or time out). The loadings to come are suspended. For the loadings, the PID is always the virtual PID Appearance of virtual carrier—all the loadings are recovered Loss of real carrier—all requested loadings will be carried out on the virtual PID. The possible associations become 'invalid'

Appearance of the real carrier—the possible associations become 'valid'

Virtual AGC, BER

In the case where the terminal is tuned to a virtual transponder not associated with a real transponder, the values of AGC (automatic gain control) and BER can be regulated from the work station during a simulation session. If the virtual transponder is associated with a real transponder, the virtual AGC and BER follow the corresponding changes of the real transponder.

Changes of the Stream During the Simulation

Adjustable Parameters

The majority of the dynamic parameters characterising the stream are adjustable during the simulation:

Cycle time for a section not belonging to a table

Cycle time for a table

Inter-section time for a table, in regular mode

First broadcast time for a table or a section

'best/worse/normal' loading time for a table or section

Activation/Deactivation of a transponder, a PID, a table, or a section (this is the only adjustable parameter for a section belonging to a table)

Change from BURST mode to REGULAR mode for a table

Addition/deletion of a table or a section

VPRIORITY option, when there is association between transponders

Addition of a PID

Unadjustable Parameters

These are parameters defined uniquely upon creation of the stream.

Transponder frequency

Association between transponders

Values of the PIDs

Section TIDs

TID and TID Ext for tables

Changes in the Static Bitstream

At the end of a session, the user is asked if he would like to conserve in the static bitstream any modifications that have been carried out during the course of the simulation. If so, the next loading would take into account the state of the stream at the end of the session. If the user does not want to conserve changes, the original stream would be reinstated. The terminal 1312 enables the reporting of the elements that have been modified.

Sequencer

A 'sequencer' tool allows the programming in advance (outside the simulation session) of stream changes. It is then possible to replay a scenario, and to make precise changes to the stream. The sequencer may also be used by the application to make precise changes to the stream in real time.

Interaction with the Debugger

When the terminal is used in combination with a debugger, a breakpoint may be inserted into the application code. In such cases, the stream may be halted for the duration of a break point. The terminal may communicate with the debugger by exchanging control signals with it, for example, over the serial link, over a network, or by means of a net proxy. If the stream has been halted, it is possible to restart the stream either at the point at which it was halted, or at any other determined point of the stream back or forward in time relative to the point at which it was halted.

The Terminal in Operation

It is important to recognise that the terminal can operate independently of the workstation after the bitstream data has been transferred from the workstation. All data required by the application can be derived either from a broadcast signal or from a virtual PID. In the latter case, data is retrieved from internal cache memory of the terminal.

It will be understood that the present invention has been described above purely by way of example, and modifications of detail can be made within the scope of the invention. Each feature disclosed in the description, and (where appropriate) the claims and drawings may be provided independently or in any appropriate combination.

What is claimed is:

1. A method of testing an application for a receiver/decoder, comprising:
   intercepting a request for data from a broadcast signal from the application;
   determining whether the request can be responded to by a debugging terminal device;
   forwarding the request to the debugging terminal device, if the debugging terminal device is capable of handling the request;
   if the debugging terminal device is not capable of handling the request:
   simulating a bitstream using a bitstream simulator to obtain simulated data, wherein the simulated data represents relevant portions of data transmitted in the broadcast signal, and wherein the simulated data is used to generate the response to the request; and
   sending the response to the application, wherein the response is used to test and debug the application.

2. A method according to claim 1, wherein the simulating is performed in the receiver/decoder.

3. A method according to claim 1, wherein the simulating is performed under the control of a receiver/decoder.

4. A method according to claim 1, wherein simulating comprises generating the simulated data in the receiver/decoder.

5. A method according claim 4, wherein the generating step utilizes a model of the broadcast signal.

6. A method according to claim 5, wherein the model includes at least one parameter.

7. A method according to claim 6, wherein the at least one parameter is a representation of data timing of data in the broadcast signal.

8. A method according to claim 6, wherein the at least one parameter is a representation of a cycle period ($t_{CYC}$) of cyclically transmitted data in the broadcast signal.

9. A method according to claim 6, wherein the at least one parameter is a representation of a noise property of the transmitted signal.

10. A method according to claim 6, wherein the at least one parameter relates to modification of data in the broadcast signal.

11. A method according to claim 6, further comprising varying the at least one parameter at least one time.

12. A method according to claim 6, further comprising varying the at least one parameter at a predetermined time after commencement of the simulating step.

13. A method according to claim 6, wherein the at least one parameter is changed by an external source.

14. A method according to claim 1, further comprising:
   performing in the receiver/decoder a process which issues a request for data from the broadcast signal; and
   supplying data from the simulated bitstream to the process in response to the request.

15. A method according to claim 14, further comprising delaying the supplying of the simulated data to the process for a particular delay period after the time ($T_{MLOAD}$) of the issue of the request.

16. A method according to claim 15, wherein at least one parameter is a representation of a cycle period ($t_{CYC}$) of cyclically transmitted data in the broadcast signal, and wherein the delay period $t_{LOAD}$ is determined in accordance with $t_{LOAD}=t_{CYC}-((T_{MLOAD}-T_0) \bmod t_{CYC})$, where $T_0$ is the time at which the cycling commenced.

17. A method according to claim 1, further comprising:
   generating the simulated data outside the receiver/decoder;
   controlling the generation of the simulated data; and
   receiving the generated simulated data in the receiver/decoder.

18. A method according to claim 1, wherein data representative of the simulation is stored in the receiver/decoder.

19. A method according to claim 1, further comprising transferring data representative of the simulation from a workstation to the receiver/decoder.

20. A method according to claim 19, wherein only part of the data representative of the simulation is transferred to the receiver/decoder at any one time.

21. A method according to claim 1, wherein the simulating step is performed at a software level between a device driver level and an application level in the receiver/decoder.

22. A method according to claim 1, further comprising:
   receiving the transmitted data in the broadcast signal;
   determining whether to simulate the transmitted data; and
   processing the transmitted data in the processing step, if the transmitted data is not simulated.

23. A method according to claim 1, wherein the transmitted data from a plurality of transponders is simulated.

24. A method according to claim 1, further comprising the step of freezing the simulation to perform debugging.

25. A receiver/decoder comprising:
   a processor configured to execute an application, wherein the application is configured to send a request for data from a broadcast signal;
   a bitstream simulator configured to simulate the reception of the broadcast signal in the receiver/decoder, wherein the bitstream simulator is configured to simulate relevant portions of data transmitted in a broadcast signal to obtain simulated data, and
   wherein the simulated data is used to generate a response to the request sent by the application when testing and debugging the application.

26. The receiver/decoder of claim 25, wherein simulating the reception of the broadcast signal comprises generating a model of the broadcast signal.

27. The receiver/decoder of claim 25, wherein the receiver/decoder further comprises a cache memory configured to store the simulated data.

28. An apparatus for testing and debugging an application, comprising:
   the application configured to send a request for data from a broadcast signal; and
   a receiver/decoder configured to execute the application, wherein the receiver/decoder comprises:
   a debugging terminal device configured to respond directly to the request for data from the broadcast signal, if the debugging terminal device is capable of handing the request; and
   a bitstream simulator configured to simulate relevant portions of data transmitted in the broadcast signal to obtain simulated data, wherein the simulated data is used to respond to a request sent by the application for data from the broadcast signal, if the debugging terminal device is not capable of handling the request from the application.

29. The apparatus of claim 28, wherein the simulated data is in the form of a virtual transponder that corresponds to a virtual frequency.

30. The apparatus of claim 28, wherein the receiver/decoder further comprises a cache memory configured to store the simulated data.

31. An apparatus for testing a broadcast system, comprising:
   an application configured to request data from a broadcast signal;
   a workstation comprising a bitstream generator tool configured to generate a model of the broadcast signal and store the model of the broadcast signal in a memory, wherein the model of the broadcast signal is used to simulate relevant portions of data transmitted in the broadcast signal to obtain simulated data; and
   a receiver/decoder configured to receive the simulated data from the workstation, wherein the simulated data is used to test and debug the application executing in the receiver/decoder.

32. The apparatus of claim 31, wherein the bitstream generator tool comprises a user interface for interaction with a user.

33. The apparatus of claim 31, wherein the workstation further comprises a database configured to store Motion Pictures Expert Group (MPEG) sections and tables used to generate the model of the broadcast signal.

34. The apparatus of claim 31, wherein the model of the broadcast signal comprises at least one parameter selected from the group consisting of a representation of timing of data in the broadcast signal, a representation of a cycle period of cyclically transmitted data in the broadcast signal, and a representation of a noise property of the broadcast signal.

35. The apparatus of claim 34, wherein the at least one parameter is varied at least one time.

36. The apparatus of claim 35, wherein the at least one parameter is varied externally by the workstation.

37. A method for testing an application, comprising:
   receiving a request for data from a broadcast signal;
   generating a model of the broadcast signal in the form of a bitstream;
   storing the bitstream in a memory;
   simulating relevant portions of data transmitted in the broadcast signal using the stored bitstream to obtain simulated data;
   generating a response to the request using the simulated data; and
   sending the response to the application, wherein the response comprises the simulated data that is used to test and debug the application.

38. A computer readable medium comprising computer readable program code embodied therein for causing a computer system comprising a debugging terminal for testing an application executing on a receiver/decoder to:
   intercept a request for data from a broadcast signal from the application;
   determine whether the request can be responded to by a debugging terminal device;
   forward the request to the debugging terminal device, if the debugging terminal device is capable of handling the request;
   if the debugging terminal device is not capable of handling the request:
      simulate a bitstream using a bitstream simulator to obtain simulated data, wherein the simulated data represents relevant portions of data transmitted in the broadcast signal, and wherein the simulated data is used to generate the response to the request; and
   send the response to the application.

* * * * *